United States Patent
Lin et al.

(10) Patent No.: US 11,662,907 B2
(45) Date of Patent: May 30, 2023

(54) DATA MIGRATION OF STORAGE SYSTEM

(71) Applicant: EMC IP Holding Company LLC, Hopkinton, MA (US)

(72) Inventors: Chao Lin, Chengdu (CN); Yuting Zhang, Chengdu (CN); Qianyun Cheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 219 days.

(21) Appl. No.: 16/888,818

(22) Filed: May 31, 2020

(65) Prior Publication Data
US 2021/0303170 A1  Sep. 30, 2021

(30) Foreign Application Priority Data

Mar. 26, 2020  (CN) ........................ 2020102265549

(51) Int. Cl.
*G06F 3/06* (2006.01)

(52) U.S. Cl.
CPC ............ *G06F 3/0608* (2013.01); *G06F 3/067* (2013.01); *G06F 3/0641* (2013.01); *G06F 3/0647* (2013.01)

(58) Field of Classification Search
CPC .... G06F 3/0608; G06F 3/0641; G06F 3/0647; G06F 3/067
See application file for complete search history.

(56) References Cited

U.S. PATENT DOCUMENTS

| | | | | |
|---|---|---|---|---|
| 9,852,149 B1 * | 12/2017 | Taylor | ................. | G06F 16/1844 707/661 |
| 9,864,658 B1 * | 1/2018 | Barcello | ............ | G06F 11/1453 707/999.003 |
| 10,108,644 B1 * | 10/2018 | Wigmore | .............. | G06F 16/214 707/661 |
| 10,956,273 B2 * | 3/2021 | Dain | ................... | G06F 11/1453 707/661 |
| 2014/0181048 A1 * | 6/2014 | Varadharajan | ........ | G06F 3/0643 707/661 |
| 2017/0255417 A1 * | 9/2017 | Dain | ...................... | G06F 3/067 707/661 |

OTHER PUBLICATIONS

Ng et al. "RevDedup: A Reverse Deduplication storage system Optimized for Reads to Latest Backups", APSys, (Year: 2013).*
"Data Protection on the Road to 'Zero Backup'", 451 Research, vol. 1, 2015 (26 pages).

* cited by examiner

*Primary Examiner* — Yuk Ting Choi
(74) *Attorney, Agent, or Firm* — Chamberlain, Hrdlicka, White, Williams & Aughtry

(57) ABSTRACT

Embodiments of the present disclosure provide a storage management method, an electronic device, and a computer program product. The method includes determining at least one count corresponding to at least one data segment of a file in a file set, the file set being stored in a local storage device, and the at least one count indicating the number of occurrences of the at least one data segment in the file set. The method further includes determining a deduplication ratio of the file based on the at least one count, the deduplication ratio indicating an overlapping level of the file with other files in the file set. The method further includes migrating the file from the local storage device to a remote storage device according to a determination that the deduplication ratio of the file is lower than a threshold.

16 Claims, 11 Drawing Sheets

DATA MIGRATION OF STORAGE SYSTEM

CROSS-REFERENCE TO RELATED APPLICATIONS

This application claims priority to Chinese Patent Application No. 2020102265549 filed on Mar. 26, 2020. Chinese Patent Application No. 2020102265549 is hereby incorporated by reference in its entirety.

TECHNICAL FIELD

Embodiments of the present disclosure generally relate to a computer system or a storage system, and more particularly, to a storage management method, an electronic device, and a computer program product.

BACKGROUND

Data protection is always an ongoing task. Today, many companies or enterprises, especially large industrial enterprises, are constantly striving to achieve low-cost and efficient data backup methods to protect data. Exponential data growth and compliance requirements pose challenges to companies and enterprises and they need to store more data than ever before. Remote storage systems such as public cloud systems and private cloud systems can provide cost-effective, on-demand, and high-availability data storage. Therefore, a large number of companies and enterprises are adopting cloud storage strategies in order to be able to migrate some local data to remote storage systems such as cloud storage systems. For these companies or enterprises, one of the biggest concerns is cost reduction.

However, for data protection storage systems using deduplication technologies, migrating local data to remote storage devices is not an easy task. In conventional data storage that does not use a deduplication technology, migrating a certain amount of data may free a corresponding amount of local storage space. However, in a storage system using deduplication technologies, because the content of migrated data and the content of data retained locally may overlap, migrating a certain amount of data may only free a relatively small amount of local storage space. In the worst case, the migrated data may completely overlap with the rest of the local data. Therefore, although the intent of users of storage systems to use remote storage may be cost reduction, they eventually pay a higher price for duplicate storage of local storage and remote storage.

SUMMARY OF THE INVENTION

Embodiments of the present disclosure relate to a storage management method, an electronic device, and a computer program product.

In a first aspect of the present disclosure, a storage management method is provided. The method includes: determining at least one count corresponding to at least one data segment of a file in a file set, the file set being stored in a local storage device, and the at least one count indicating the number of occurrences of the at least one data segment in the file set. The method further includes: determining a deduplication ratio of the file based on the at least one count, the deduplication ratio indicating an overlapping level of the file with other files in the file set. The method further includes: migrating the file from the local storage device to a remote storage device according to a determination that the deduplication ratio of the file is lower than a threshold.

In a second aspect of the present disclosure, an electronic device is provided. The electronic device includes at least one processor and at least one memory storing computer program instructions. The at least one memory and the computer program instructions are configured to, together with the at least one processor, cause the electronic device to perform a process. The process includes: determining at least one count corresponding to at least one data segment of a file in a file set, the file set being stored in a local storage device, the at least one count indicating the number of occurrences of the at least one data segment in the file set. The process further includes: determining a deduplication ratio of the file based on the at least one count, the deduplication ratio indicating an overlapping level of the file with other files in the file set. The process further includes: migrating the file from the local storage device to a remote storage device according to a determination that the deduplication ratio of the file is lower than a threshold.

In a third aspect of the present disclosure, a computer program product is provided. The computer program product is tangibly stored on a non-volatile computer-readable medium and includes machine-executable instructions. The machine-executable instructions, when executed, cause a machine to perform the steps of the method according to the first aspect.

It should be understood that what is described in the Summary section is not intended to limit key or important features of the embodiments of the present disclosure, nor is it intended to limit the scope of the present disclosure. Other features of the present disclosure will become readily understood from the following description.

BRIEF DESCRIPTION OF THE DRAWINGS

The above and other objectives, features, and advantages of the embodiments of the present disclosure will become easily understood by reading the following detailed description with reference to the accompanying drawings. In the drawings, several embodiments of the present disclosure are illustrated by way of example and not limitation.

Throughout the drawings, the same or similar reference numerals are used to indicate the same or similar components.

DETAILED DESCRIPTION

Figure 1:
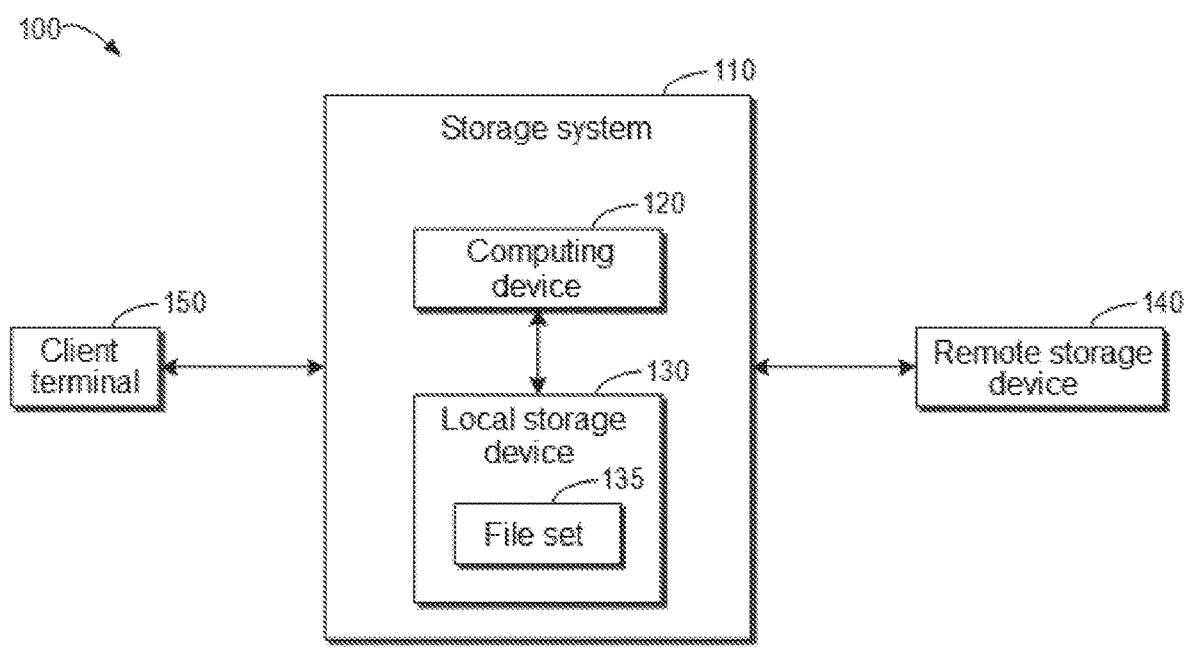
FIG. 1 illustrates a schematic diagram of an example storage environment in which embodiments of the present disclosure can be implemented.

The principles of the present disclosure will be described below with reference to several exemplary embodiments shown in the drawings. It should be understood that these specific embodiments are described only to enable those skilled in the art to better understand and implement the present disclosure, and not to limit the scope of the present disclosure in any way. In the following description and claims, unless defined otherwise, all technical and scientific terms used herein have the same meaning as commonly understood by one of ordinary skill in the art to which the present disclosure belongs.

With the development of remote storage systems such as cloud storage systems, many data protection vendors have begun to provide cloud-tier solutions for backup data migration. For example, these data protection providers can provide options to allow clients to migrate data from local to remote storage systems such as cloud storage systems. Currently, there are two basic methods used to migrate local data to remote storage systems.

The first method is an on-demand migration method, which leaves the task of selecting data for migration to a client. The client needs to manually select the data from a local storage device and move it to a remote storage device. Generally, it is not easy for clients to select the data that is suitable for migration to a remote storage device. In fact, due to the complexity of data deduplication technologies, clients are likely to be unable to properly select data for migration that has less overlap with the rest of the local data. As a result, even after clients select to migrate some data to a remote storage device, they cannot save much local storage space.

The second method is a policy-based migration method. Compared with the on-demand migration method, it does not require clients to manually select data for migration, but instead pre-creates a policy to automatically or periodically migrate data from local storage devices to remote storage devices. The problem of this method lies in that the data migration policy itself is determined based on some pre-defined factors. For example, backup data that has been stored for more than a period of time (such as 14 days) will be extracted and migrated to a remote storage device. However, such a static migration policy cannot dynamically reflect the actual state of a data set. For example, backup data stored more than 14 days may still be the base data for incoming new backup data. In this case, the new backup data is highly overlapping with the previous backup data, so migrating such backup data to a remote storage device will not help reduce data storage costs.

It can be seen that in a storage system using the deduplication technology, because the content of data migrated and the content of data retained locally may overlap, migrating a certain amount of data may only release a little local storage space. In the worst case, the migrated data may completely overlap with the rest of the local data. Therefore, although the intent of users of storage systems to use remote storage may be cost reduction, they eventually pay a higher price for duplicate storage of local storage and remote storage.

In view of the above problems and other potential problems in the conventional solutions, the embodiments of the present disclosure provide a solution for data migration of a storage system to selectively migrate data from a local storage device to a remote storage device in order to minimize data storage costs without losing data protection efficiency. To achieve this objective, in some embodiments of the present disclosure, data overlapping at a lower level with other local data may be migrated to a remote storage device. In addition, the embodiments of the present disclosure are well designed for the deduplication technology, so that incremental backup data of base data that has been migrated to the remote storage device can also be stored in the remote storage device using the deduplication technology, thus maintaining the data protection efficiency to the maximum extent.

Compared with the conventional solutions, the embodiments of the present disclosure can achieve one or more of the following technical advantages. Conventional solutions are not user-friendly and inefficient. More notably, conventional solutions cannot guarantee that after local data is migrated to a remote storage device, the storage space of a local storage device is substantially saved to reduce data storage costs. In contrast, with the embodiments of the present disclosure, data with a low deduplication ratio can be automatically and regularly migrated to a remote storage device without much overhead, and incremental backup data of base data that has been migrated to the remote storage device can also be stored in the remote storage device at a later time, for example, through a virtual synthesis (VS) or fast copy and overwrite (FCOW) technology. Therefore, the embodiments of the present disclosure may not only can improve the data deduplication ratio of the storage system, but also can save data storage costs. In summary, the embodiments of the present disclosure can achieve efficient, low-cost, and low-overhead migration of data in a storage system. Some embodiments of the present disclosure will be described below in detail with reference to FIGS. 1 to 11.

FIG. 1 illustrates a schematic diagram of an example storage environment 100 in which embodiments of the present disclosure can be implemented. As shown in FIG. 1, in example storage environment 100, storage system 110 may include computing device 120 for controlling and managing storage system 110. For example, computing device 120 may process access requests to data stored in storage system 110, organize and manage files (or data) in storage system 110, control and access other devices or components in the storage system 110, and so on. More generally, computing device 120 may implement any computing function, control function, processing function, and/or the like related to storage system 110.

Storage system 110 may further include local storage device 130. Local storage device 130 is a local storage device with respect to storage system 110 and can be used to store various files (or data) related to storage system 110.

For example, local storage device 130 may store file set 135, and file set 135 may include data stored in a file form. In some embodiments, local storage device 130 may include a storage device with high performance and cost, and may be used to store "hot data" with a high access frequency. In some embodiments, the file (or data) stored in local storage device 130 may be backup data of other data. It should be understood that although FIG. 1 shows local storage device 130 as being located within storage system 110, this is merely an example and is not intended to limit the scope of the present disclosure in any way. In some embodiments, local storage device 130 may also be external to storage system 110 and communicatively coupled with storage system 110 through a communication link.

Storage system 110 may further include remote storage device 140. Remote storage device 140 is a storage device remote from storage system 110 and may also be used to store various data (or files) related to storage system 110. For example, storage system 110 may migrate data (or files) from local storage device 130 to remote storage device 140, thereby releasing the storage space of local storage device 130. In some embodiments, compared with local storage device 130, remote storage device 140 may include a storage device with low performance and cost, and may be used to store "cold data" with a low access frequency. In some embodiments, remote storage device 140 may include a cloud storage device. In other embodiments, remote storage device 140 may also include any other suitable storage device remote from the storage system 110.

In addition, example storage environment 100 may further include client terminal 150. In some embodiments, a user of storage system 110 may store files (or data) in storage system 110 through client terminal 150, and may read files (or data) from storage system 110 through client terminal 150. More generally, a user of storage system 110 may perform any operation associated with storage system 110 through client terminal 150.

In some embodiments, computing device 120 may include any device capable of implementing computing functions and/or control functions, including, but not limited to, a special-purpose computer, a general-purpose computer, a general-purpose processor, a microprocessor, a microcontroller, or a state machine. Computing device 120 may also be implemented as an individual computing device or a combination of computing devices, such as a combination of a digital signal processor (DSP) and a microprocessor, multiple microprocessors, one or more microprocessors in conjunction with a DSP core, or any other such configuration. It is further noted that in the context of the present disclosure, computing device 120 may also be referred to as electronic device 120, and these two terms may be used interchangeably herein.

In some embodiments, local storage device 130 may be any device capable of providing storage services or functions locally in storage system 110, including, but not limited to, a hard disk (HDD), a solid state disk (SSD), a removable disk, a compact disk (CD), a laser disk, an optical disk, a digital versatile disk (DVD), a floppy disk, a Blu-ray disk, a serial attached small computer system interface (SCSI) storage disk (SAS), a serial advanced technology attached (SATA) storage disk, any other magnetic storage device and any other optical storage device, or any combination thereof.

In some embodiments, remote storage device 140 may also include any storage-capable device located far away from storage system 110 and capable of providing storage services or functions, including, but not limited to, a hard disk (HDD), a solid-state disk (SSD), a removable disk, a compact disk (CD), a laser disk, an optical disk, a digital versatile disk (DVD), a floppy disk, a Blu-ray disk, a serial attached small computer system interface (SCSI) storage disk (SAS), a serial advanced technology attached (SATA) storage disk, any other magnetic storage device and any other optical storage device, or any combination thereof.

In some embodiments, client terminal 150 may refer to any device capable of generating data and receiving data storage services. In some embodiments, such devices include, but are not limited to, personal computers, tablet computers, laptop computers, notebook computers, netbook computers, computers of any other types, cell phones or smartphones, media player devices, e-book devices, mobile WiFi devices, wearable computing devices, wireless devices, mobile devices, user equipment, and electronic computing devices of any other types.

In some embodiments, the communication link between various components in example storage environment 100 may be any form of connection or coupling that enables data communication or control signal communication between these components, including but not limited to coaxial cables, fiber optic cables, twisted pair, or wireless technologies (such as infrared, radio, and microwave). In some embodiments, the communication link may further include, but is not limited to, network cards, hubs, modems, repeaters, bridges, switches, routers and other devices used for network connection, as well as various network connection lines, and wireless links. In some embodiments, the communication link may include various types of buses. In other embodiments, the communication link may include a computer network, a communication network, or other wired or wireless networks.

It should be understood that FIG. 1 only schematically illustrates units, modules, or components, related to embodiments of the present disclosure, in example storage environment 100. In practice, example storage environment 100 may further include other units, modules, or components for other functions. In addition, the specific numbers of units, modules, or components shown in FIG. 1 are only schematic and are not intended to limit the scope of the present disclosure in any way. In other embodiments, example storage environment 100 may include any suitable number of storage systems, computing devices, local storage devices, remote storage devices, client terminals, or the like. Therefore, the embodiments of the present disclosure are not limited to the specific devices, units, modules, or components depicted in FIG. 1, but are generally applicable to any storage environment having a local storage device and a remote storage device. Example file set 135 of an embodiment of the present disclosure will be further described below with reference to FIG. 2.

Figure 2:
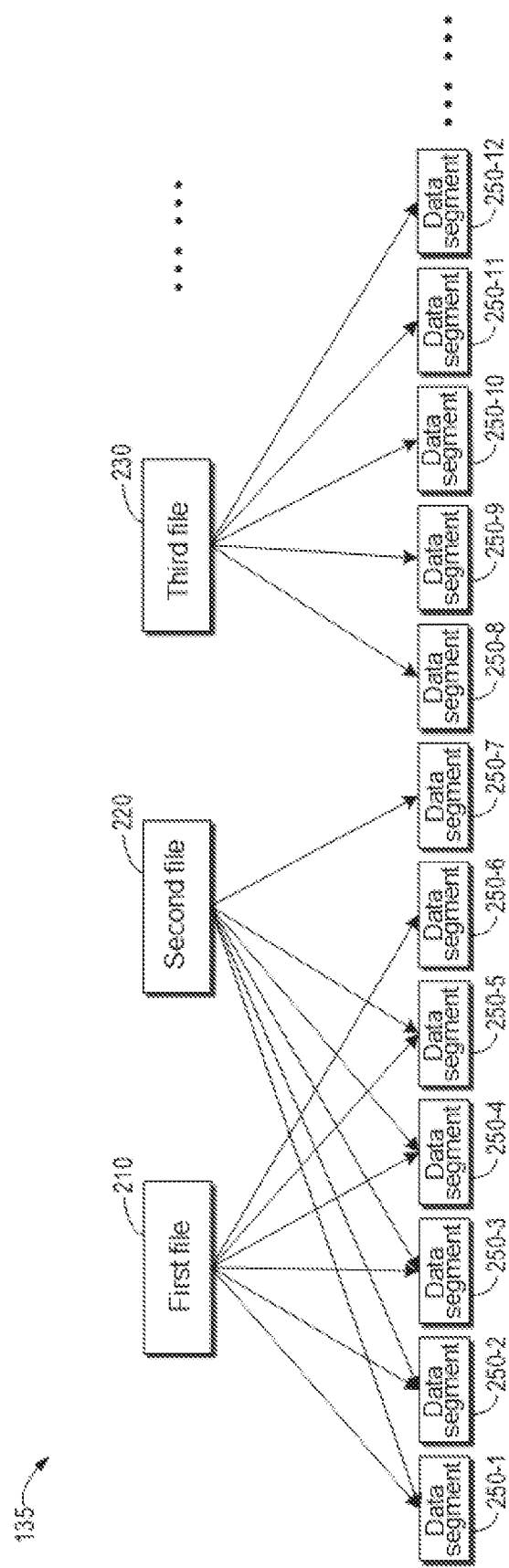
FIG. 2 illustrates an example of files included in a file set and data segments of the files according to an embodiment of the present disclosure.

FIG. 2 illustrates an example of files included in file set 135 and data segments of the files according to an embodiment of the present disclosure. In the example of FIG. 2, file set 135 may include first file 210, second file 220, and third file 230. First file 210 may include data segment 250-1, data segment 250-2, data segment 250-3, data segment 250-4, data segment 250-5, and data segment 250-6. Second file 220 may include data segment 250-1, data segment 250-2, data segment 250-3, data segment 250-4, data segment 250-5, and data segment 250-7. Third file 230 may include data segment 250-8, data segment 250-9, data segment 250-10, data segment 250-11, and data segment 250-12. In some embodiments, the data segments of the files may also be referred to as data blocks, data slices, etc., and the data segments may be variable-sized to avoid duplicate data segments as much as possible.

As shown in FIG. 2, unlike a conventional data storage method that does not use the deduplication technology, the basic feature of file set 135 in data protection storage system 110 with the deduplication function is that data is deduplicated across multiple different files. In other words, there is data overlap (or data duplication) between different files. The higher the deduplication ratio of storage system 110 is, the more data overlap may exist between different files in file set 135. For example, in the example of FIG. 2, there are overlapping data segments 250-1 to 250-5 between first file 210 and second file 220.

Data segment overlap between different files in file set 135 poses a challenge for file (or data) migration of storage system 110. Specifically, in the example of FIG. 2, it is assumed that second file 220 is selected to be migrated from local storage device 130 to remote storage device 140. Since second file 220 overlaps first file 210 in a large number of data segments, after second file 220 is migrated to remote storage device 140, local storage device 130 does not release too much storage space, but instead consumes the storage space of remote storage device 140 by the same copy data segments (for example, data segments 250-1 to 250-5), resulting in increased rather than reduced cost for data storage.

In contrast, if third file 230 is selected to be migrated from local storage device 130 to remote storage device 140, because third file 230 has no data segment overlap with the rest files (for example, first file 210 and second file 220), the storage space of local storage device 130 can be saved, thereby reducing data storage costs. For this reason, the embodiments of the present disclosure can identify files in file set 135 that overlap with other files at a low level for migration, thereby reducing the data storage cost of storage system 110 without lowering the data storage efficiency. A storage management method according to an embodiment of the present disclosure will be described below in detail with reference to FIG. 3.

It will be understood that the specific numbers of files and data segments shown in FIG. 2 are only schematic and not intended to limit the scope of the present disclosure in any way. In other embodiments, file set 135 may include any suitable number of files, and the files may include any suitable number of data segments. Therefore, the embodiments of the present disclosure are not limited to the specific number of files, the specific number of data segments, and the specific association relationship between files and data segments depicted in FIG. 2, but are generally applicable to any number of files, any number of data segments, and any association relationship between files and data segments.

Figure 3:
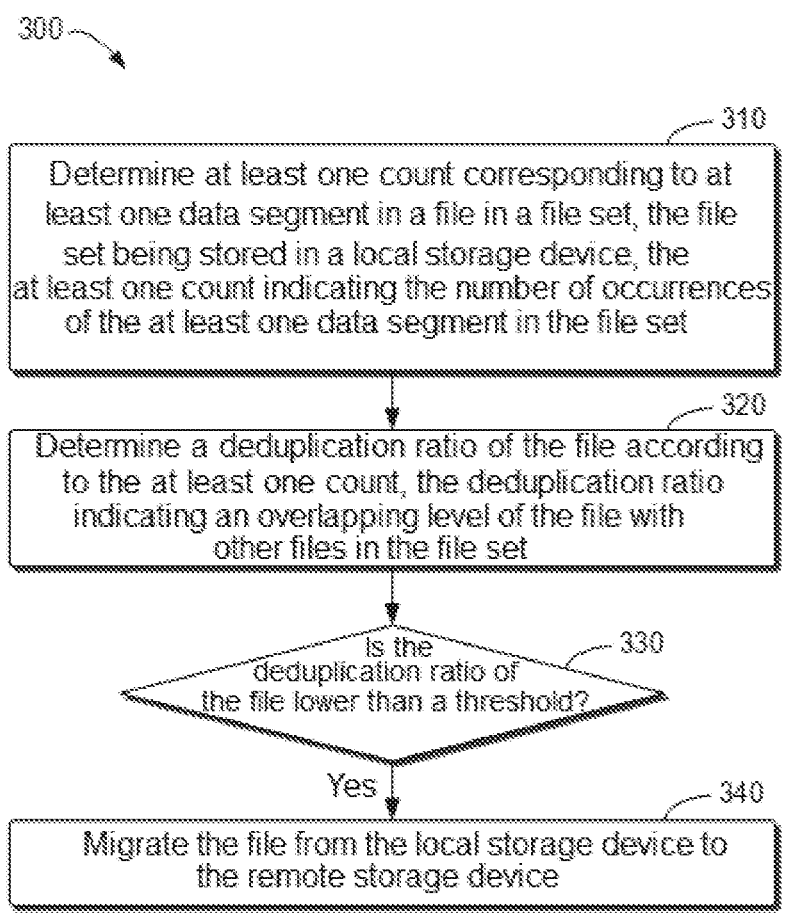
FIG. 3 illustrates a flowchart of a storage management method according to an embodiment of the present disclosure.

FIG. 3 illustrates a flowchart of storage management method 300 according to an embodiment of the present disclosure. In some embodiments, method 300 may be implemented by computing device 120 in storage system 110, for example, by a processor or a processing unit of computing device 120, or by various functional modules of computing device 120. In other embodiments, method 300 may also be implemented by a computing device independent of storage system 110, or may be implemented by other units or modules in storage system 110.

For ease of discussion and without loss of generality, method 300 will be described below with reference to FIGS. 1 and 2 using first file 210, second file 220, and third file 230 as examples. It should be understood, however, that embodiments of the present disclosure are not limited to any particular file, but are equally applicable to any file including data segments.

At 310, computing device 120 may determine one or more counts corresponding to one or more data segments of a certain file in file set 135, and the one or more counts may respectively indicate the numbers of occurrences of the one or more data segments in file set 135. It should be noted that a file in file set 135 usually includes a plurality of data segments. In such a case, each data segment in the plurality of data segments may correspond to one count to indicate how many times the data segment appears in all the files in file set 135.

However, in some scenarios, there may also be files in file set 135 that include only one data segment. In such a scenario, computing device 120 may determine a count corresponding to the data segment of the file, and the count may indicate the number of occurrences of the data segment in all the files in file set 135. In the context of the present disclosure, for simplicity of description, some embodiments of the present disclosure may be described using a file including a plurality of data segments as an example. It will be understood, however, that embodiments of the present disclosure are equally applicable to files that include only one data segment.

In the example of FIG. 2, for simplicity and without loss of generality, it is assumed that file set 135 only includes first file 210, second file 220, and third file 230. Under this assumption, computing device 120 may determine that the count corresponding to data segment 250-1 of first file 210 is 2 because both first file 210 and second file 220 include data segment 250-1 and third file 230 does not include data segment 250-1. That is, data segment 250-1 appears twice in file set 135.

Similarly, computing device 120 may determine that the counts corresponding to data segment 250-2, data segment 250-3, data segment 250-4, and data segment 250-5 of first file 210 are also all 2 because both first file 210 and second file 220 include data segment 250-2, data segment 250-3, data segment 250-4, and data segment 250-5, and third file 230 does not include data segment 250-2, data segment 250-3, data segment 250-4, or data segment 250-5. That is, these data segments each appear twice in file set 135.

Unlike data segments 250-1 to 250-5, computing device 120 may determine that the count corresponding to data segment 250-6 of first file 210 is 1 because first file 210 includes data segment 250-6, but neither second file 220 nor third file 230 includes data segment 250-6. That is, data segment 250-6 appears once in file set 135.

In addition, computing device 120 may determine that the count corresponding to data segment 250-1 of second file 220 is 2 because both first file 210 and second file 220 include data segment 250-1 and third file 230 does not include data segment 250-1. That is, data segment 250-1 appears twice in file set 135.

Similarly, computing device 120 may determine that the counts corresponding to data segment 250-2, data segment 250-3, data segment 250-4, and data segment 250-5 of second file 220 are also 2 because both first file 210 and second file 220 include data segment 250-2, data segment 250-3, data segment 250-4, and data segment 250-5, and third file 230 does not include data segment 250-2, data segment 250-3, data segment 250-4 or data segment 250-5. That is, these data segments each appear twice in file set 135.

Unlike data segments 250-1 to 250-5, computing device 120 may determine that the count corresponding to data segment 250-7 of second file 210 is 1 because second file 220 includes data segment 250-7, but neither first file 210 nor third file 230 includes data segment 250-7. That is, data segment 250-7 appears once in file set 135.

Further, computing device 120 may determine that the counts corresponding to data segment 250-8, data segment 250-9, data segment 250-10, data segment 250-11, and data segment 250-12 of third file 230 are all 1 because third file 230 includes these data segments, but neither first file 210 nor second file 220 includes these data segments. That is, these data segments each appear once in file set 135.

It should be noted that computing device 120 may use any suitable method to determine respective counts corresponding to respective data segments of a certain file. For example, for a certain file, computing device 120 may first determine which data segments the file includes, and then count the number of times each data segment appears in file set 135 in sequence. For another example, computing device 120 may sequentially compare a certain file with other files in file set 135, so as to determine data segments common to the file and other files and how many files these data segments overlap with, and computing device 120 may then determine respective counts corresponding to the respective data segments of the file based on the comparison between the files.

In other embodiments, computing device 120 may further determine all data segments included in the files in file set 135, then determine respective counts corresponding to all the data segments, and then determine, from these counts, counts corresponding to data segments included in a certain file. This solution can significantly reduce the amount of computations related to the above counts in the case where file set 135 includes a large number of files. Such an embodiment will be described below in detail with reference to FIG. 4.

With continued reference to FIG. 3, at 320, computing device 120 may determine a deduplication ratio (also referred to as a deduplication index) of the file according to one or more counts corresponding to one or more data segments of the file, and the determined deduplication ratio may indicate the overlapping level of the file with other files in file set 135. In other words, for a certain file in file set 135, computing device 120 may determine a deduplication ratio for the file to quantitatively indicate the overlapping level of the file with other files in file set 135.

It will be understood that for a certain data segment of a file, the count determined by computing device 120 for the data segment in block 310 may actually indicate an overlapping level of the data segment (which is a part of the file) with other files in file set 135. Therefore, the overall deduplication ratio of a certain file can be obtained on the basis of the overlapping level of each data segment of the file with other files (i.e., respective counts corresponding to these data segments).

Specifically, computing device 120 may use any suitable method to obtain the deduplication ratio of the file according to respective counts corresponding to the data segments of the file as long as the deduplication ratio can reflect the overlapping level of the file with other files. For example, for a certain file, computing device 120 may sum the counts corresponding to data segments of the file, and then divide the sum by the number of data segments of the file to obtain the deduplication ratio of the file.

In this way, in the example of FIG. 2, the deduplication ratio of first file 210 and second file 220 can be calculated as $(2+2+2+2+2+1)/6=11/6$, and the deduplication ratio of third file 230 can be calculated as $(1+1+1+1+1)/5=1$. In this calculation method, the deduplication ratio (11/6) of first file 210 and second file 220 is higher than the deduplication ratio (1) of third file 230, indicating that the overlapping level of first file 210 and second file 220 with other files is higher than that of third file 230 with other files.

As another example of obtaining the deduplication ratio of a file, for a certain file, computing device 120 may sum the reciprocals of the counts corresponding to data segments of the file, divide the sum by the number of data segments of the file, and then calculate the reciprocal to obtain the deduplication ratio of the file. In this way, in the example of FIG. 2, the deduplication ratio of first file 210 and second file 220 can be calculated as $6/(1/2+1/2+1/2+1/2+1/2+1)=12/7$, and the deduplication ratio of third file 230 can be calculated as $5/(1+1+1+1+1)=1$. In this calculation method, the deduplication ratio (12/7) of first file 210 and second file 220 is higher than the deduplication ratio (1) of third file 230, indicating that the overlapping level of first file 210 and second file 220 with other files is higher than that of third file 230 with other files.

In other embodiments, when determining a deduplication ratio for a file, computing device 120 may also consider the number of duplications of each data segment within the file, so as to determine the deduplication ratio of the file more accurately. Such an embodiment will be described below in detail with reference to FIG. 5. It should be noted that the embodiments of the present disclosure are not limited to any specific method for calculating a deduplication ratio of a file, but are equally applicable to any suitable method for calculating a deduplication ratio of a file, as long as the resulting deduplication ratio can quantitatively measure the overlapping level of one file with other files. In addition, in some embodiments, computing device 120 may sort multiple or all files in file set 135 according to the deduplication ratio, so that it can more quickly determine which files have a deduplication ratio lower than a threshold.

With continued reference to FIG. 3, at 330, computing device 120 may determine whether the deduplication ratio of the file is lower than the threshold. In some embodiments, the threshold here is set to determine whether the deduplication ratio of a file is lower than a predetermined level, and thus the file is considered suitable for migration from local storage device 130 to remote storage device 140. In other words, if the deduplication ratio of a file is higher than the threshold, it can be considered that the overlapping level of the file with other files in file set 135 is high, so it is not suitable to be migrated to remote storage device 140. Conversely, if the deduplication ratio of a file is lower than the threshold, it can be considered that the overlapping level of the file with other files in file set 135 is low, so it is suitable to be migrated to remote storage device 140.

It should be noted that the selection or setting of the threshold may take into account various possible factors. As an example, these factors may include a calculation method of a deduplication ratio of a file, the proportion of files in file set 135 to be migrated to remote storage device 140 in file set 135, an empirical value obtained on the basis of historical data of file migration, a total deduplication ratio of file set 135, and so on. Based on one or more of these factors, computing device 120 may reasonably determine the above threshold. For example, for the different calculation methods described above for computing the deduplication ratio of a file, computing device 120 may appropriately determine different thresholds. For another example, if a higher proportion of files in file set 135 needs to be migrated to remote storage device 140, computing device 120 may determine a higher threshold so that the deduplication ratio of more files may be lower than the threshold. As another example, historical data related to file migration of storage system 110 may be used to adjust the threshold.

In other embodiments, because the total deduplication ratio of file set 135 actually reflects an average level of deduplication ratios of all files in file set 135, the determination of the threshold may also refer to the total deduplication ratio of file set 135. That is, computing device 120 can use the total deduplication ratio of file set 135 as a reference value to determine the threshold, so that the overall overlapping level of file set 135 can be referenced to reasonably determine files of a higher or lower overlapping level with other files. Specifically, computing device 120 may first determine the total deduplication ratio of file set 135 based on the logical size and physical size of file set 135. For example, assuming that file set 135 logically stores 1 billion bytes (1 GB) of data and actually occupies 700 million bytes (0.7 GB) of physical storage space, the total deduplication ratio of file set 135 can be calculated as 1/0.7=10/7.

After determining the total deduplication ratio of file set 135, computing device 120 may determine the above threshold based on the total deduplication ratio of file set 135. For example, computing device 120 may directly set the threshold to the total deduplication ratio of file set 135, or set the threshold to be slightly lower than the total deduplication ratio of file set 135. In this way, computing device 120 can ensure that files having deduplication ratios lower than the average level of file set 135 are determined as having a low overlapping level with other files. Migrating such files from local storage device 130 to remote storage device 140 can significantly reduce the data storage cost of storage system 110.

At 340, if computing device 120 determines that the deduplication ratio of a file is lower than the threshold, computing device 120 may migrate the file from local storage device 130 to remote storage device 140. For example, in the example of FIG. 2, it is assumed that the deduplication ratio of first file 210 and second file 220 is 11/6, and the deduplication ratio of third file 230 is 1 according to a method for calculating the deduplication ratio, and the threshold here is set to 1.5. In such as case, computing device 120 can determine that the deduplication ratio of third file 230 is lower than the threshold, and computing device 120 may migrate third file 230 from local storage device 130 to remote storage device 140. Conversely, computing device 120 can determine that the deduplication ratio of first file 210 and second file 220 is higher than the threshold, and computing device 120 may not migrate first file 210 and second file 220 from local storage device 130 to remote storage device 140.

In general, in addition to data segments, the files in file set 135 may further include metadata associated with the files. Generally, the metadata of a file can be used to indicate or record any information related to the file. For example, in the context of the present disclosure, the metadata of a certain file may indicate which data segments the file includes, or further indicate how these data segments are organized to form the file. In some embodiments, during the process of migrating a file from local storage device 130 to remote storage device 140, computing device 120 may adopt different processing methods for the metadata of the file.

For example, as an example migration method, when a file is migrated from local storage device 130 to remote storage device 140, the metadata of the file may also be migrated from local storage device 130 to remote storage device 140. In other words, computing device 120 may first copy the file and its metadata from local storage device 130 to remote storage device 140, and then computing device 120 may delete the file and its metadata from local storage device 130. In this way, all data and information associated with the file can be transferred to remote storage device 140, thereby releasing the storage space of local storage device 130 to the greatest extent.

However, in other embodiments, when a file is migrated from local storage device 130 to remote storage device 140, the metadata of the file may be stored in both local storage device 130 and remote storage device 140. In this way, when it is necessary to retrieve or obtain information related to the file (for example, data segment information of the file), computing device 120 can quickly and conveniently obtain the information from local storage device 130 without accessing remote storage device 140. In addition, the metadata associated with the file retained in local storage device 130 may also implicitly indicate that the file is stored in remote storage device 140. In some scenarios, this may simplify further operations of computing device 120 on the file. For example, the subsequent storage process for an incremental backup file of the file can be optimized. Such an embodiment will be described below in detail with reference to FIG. 6.

It should be noted that storage management method 300 depicted in FIG. 3 can be executed at any phase or time window during the operation of storage system 110. In other words, computing device 120 may initiate and execute storage management method 300 at any time, so as to migrate files having a deduplication ratio lower than the threshold from local storage device 130 to the remote storage device 140. However, in some embodiments, in order to reduce adverse impacts of the execution of storage management method 300 on the normal operation of storage system 110, and in order to share the processing flow or data with other existing processes of storage system 110, storage management method 300 may be performed during the garbage collection (GC) process of local storage device 130, and this execution mode can provide various technical advantages, which will be described below in detail.

First, executing storage management method 300 during the garbage collection phase of local storage device 130 can avoid resource competition between storage management method 300 and conventional data backup, data restoration, and other operations of local storage device 130. In some cases, storage management method 300 may involve some processor- and memory-intensive operations, so frequently performing storage management method 300 may occupy processor and memory resources used to perform other normal data protection operations of local storage device 130. In contrast, the garbage collection phase of local storage device 130 may be performed at a long time interval (for example, weekly or monthly), such a time span can ensure that sufficient data has been accumulated for migration to remote storage device 140 by storage management method 300, and ensure that normal data protection operations will not be affected by the execution of storage management method 300.

Second, storage management method 300 is for migrating files (or data) from local storage device 130 to remote storage device 140 to reduce data storage costs. If some files in local storage device 130 are outdated or expired, there is no need to migrate these files. However, before the garbage collection process is performed, such outdated or expired files may be considered valid data and then be migrated, which may introduce inaccuracy to storage management method 300. Therefore, storage management method 300 is arranged during or after the garbage collection phase, that is, after the confirmation that all files in local storage device 130 are valid, thereby ensuring that the deduplication ratio of the files in local storage device 130 is calculated correctly, and ensuring that outdated or outdated files are not migrated to remote storage device 140.

In addition, the garbage collection phase of local storage device 130 may also involve establishing a global data segment count of file set 135 to list all data segments included in all files, to further find data segments that are not referenced by any files and collect the data segments as garbage. Therefore, in some embodiments, the information about data segments obtained during the garbage collection process of local storage device 130 may be reused to perform storage management method 300; or conversely, the information about data segments determined during the execution of storage management method 300 may be reused to perform the garbage collection process of local storage device 130. This reuse can avoid introducing additional processor or memory overhead to repeatedly obtain the same information about data segments. Examples of such reuse will be described further below.

As mentioned above when describing block 310 of FIG. 3, in some embodiments, when determining respective counts corresponding to data segments of the files in file set 135, computing device 120 may first determine all the data segments in file set 135, then determine the respective counts corresponding to all data segments, and then determine the corresponding counts of the data segments included in a certain file from these counts. Such an embodiment will be described below in detail with reference to FIG. 4.

Figure 4:
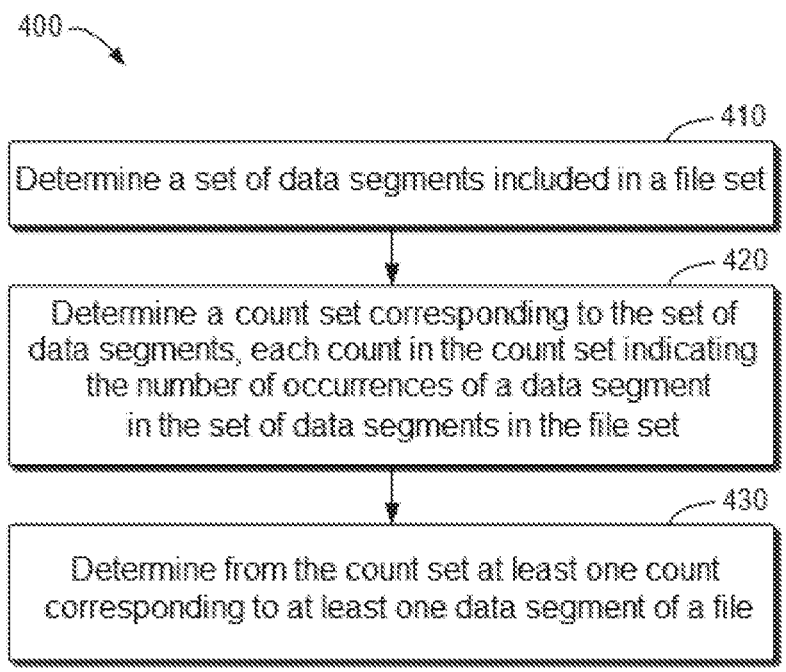
FIG. 4 illustrates a flowchart of an example process for determining a count corresponding to data segments of a file according to an embodiment of the present disclosure.

FIG. 4 illustrates a flowchart of example process 400 for determining a count corresponding to a data segment of a file according to an embodiment of the present disclosure. In some embodiments, process 400 may be implemented by computing device 120 in storage system 110, for example, by a processor or a processing unit of computing device 120, or by various functional modules of computing device 120. In other embodiments, process 400 may also be implemented by a computing device independent of storage system 110, or may be implemented by other units or modules in storage system 110.

For ease of discussion and without loss of generality, process 400 will be described below with reference to FIGS. 1 and 2 using first file 210, second file 220, and third file 230 as examples. It should be understood, however, that embodiments of the present disclosure are not limited to any particular file, but are equally applicable to any file including data segments.

At 410, computing device 120 may determine a set of data segments included in file set 135. For example, computing device 120 may scan all files in file set 135 to determine a set of data segments consisting of all data segments included in file set 135. For example, in the example of FIG. 2, computing device 120 may determine that the set of data segments included in file set 135 consists of data segments 250-1 to 250-12. In some embodiments, the files in file set 135 may have metadata indicating which data segments the files includes, for example, the fingerprint information of the files. In such a case, computing device 120 may know the set of data segments included in file set 135 by scanning the fingerprint of each file.

At 420, computing device 120 may determine a count set corresponding to the set of data segments in file set 135, and each count in the count set may indicate the number of occurrences of a data segment in the set of data segments in the file set. In other words, for each of the data segments included in file set 135, computing device 120 may determine the number of occurrences of the data segment in file set 135, thereby determining a count corresponding to the data segment. For example, computing device 120 may set a corresponding counter for each data segment, and during the scanning of all files in file set 135, computing device 120 may use the counter to record how many times the data segment appears in these files. For example, in the example of FIG. 2, computing device 120 may determine that a count set corresponding to the set of data segments 250-1 to 250-12 is {2, 2, 2, 2, 2, 1, 1, 1, 1, 1, 1, 1}.

At 430, from the count set corresponding to the set of data segments included in file set 135, computing device 120 may determine respective counts corresponding to data segments of a certain file. Specifically, computing device 120 may determine the data segments included in the file. For example, during the scanning of the files in file set 135, computing device 120 may know which data segments each file includes. After determining which data segments are included in a certain file, computing device 120 can then find out the counts corresponding to these data segments from the above-mentioned count set.

For example, in the example of FIG. 2, computing device 120 may determine that first file 210 includes data segment 250-1, data segment 250-2, data segment 250-3, data segment 250-4, data segment 250-5, and data segment 250-6, second file 220 includes data segment 250-1, data segment 250-2, data segment 250-3, data segment 250-4, data segment 250-5, and data segment 250-7, and third file 230 includes data segment 250-8, data segment 250-9, data segment 250-10, data segment 250-11, and data segment 250-12. Then, based on the count set {2, 2, 2, 2, 2, 1, 1, 1, 1, 1, 1, 1} corresponding to the set of data segments 250-1 to 250-12, computing device 120 may determine that counts corresponding to the data segments 250-1 to 250-6 of first file 210 are {2, 2, 2, 2, 2, 1}, counts corresponding to the data segments 250-1 to 250-5 and 250-7 of second file 220 are also {2, 2, 2, 2, 2, 1}, and counts corresponding to the data segments 250-8 to 250-12 of third file 230 are {1, 1, 1, 1, 1}.

By using example process 400 to determine counts corresponding to data segments of a file, computing device 120 may avoid scanning all other files in file set 135 for each data segment of each file, but may instead perform scanning once to determine the count set corresponding to all the data segments in file set 135. Then, for a certain file, computing device 120 may determine counts corresponding to data segments of the file by searching in the count set. Therefore, example process 400 can significantly reduce the complexity and quantity of processing resources used to determine the counts corresponding to the data segments of the file, and this advantage is more significant as the number of files in file set 135 is larger.

As mentioned above, in some embodiments, storage management method 300 of the embodiments of the present disclosure may be performed during the garbage collection process for local storage device 130. In such an embodiment, storage management method 300 and the garbage collection process of local storage device 130 may share some identical processing processes or information. For example, computing device 120 may perform the garbage collection process of local storage device 130 based on the determined set of data segments and the determined count set through example process 400. In other words, the set of data segments and the count set described above can be reused to perform the garbage collection process of local storage device 130. More specifically, if some counts in the above count set are zero, it means that there are data segments in the set of data segments that are not referenced by any files, which may be caused because the files are outdated or expired. Therefore, the garbage collection process of local storage device 130 may collect these data segments that are not referenced by any files to release storage space.

In this way, computing device 120 only needs to perform one determination operation to obtain the set of data segments included in file set 135 and the corresponding count set, and the obtained result can be used for two processes, i.e., the process of determining a to-be-migrated file to remote storage device 140 and the process of garbage collection of local storage device 130, thereby saving resources of storage system 110 (for example, computing resources, storage resources, etc.), avoiding introducing additional overhead, and also improving the efficiency of the garbage collection process of local storage device 130.

As a more specific example, the garbage collection of local storage device 130 may include three main steps. First, computing device 120 may scan metadata information (e.g., fingerprint information) of files in the file set 135 to establish a global representation for all data segments in local storage device 130. Then, computing device 120 may enumerate the data segment organization structure (e.g., Merkel tree structure) of all files in the name space of the file system of file set 135 to mark whether each data segment is a valid data segment in the global representation. Computing device 120 may then pick out those data segments that are not marked as valid and collect them as garbage.

In some embodiments, the first two steps of the garbage collection process may be reused in storage management method 300 to calculate the deduplication ratio of each file. It should be noted that for some data protection systems, the global representation for data segments in the first step of the garbage collection process may not record the total number of times each data segment is referenced by all files in file set 135, because garbage collection only focuses on whether the number of times the data segment is referenced by the files is higher than zero. In order to make the first step of the garbage collection process suitable for reuse in the execution of storage management method 300, computing device 120 may configure the global representation in the garbage collection process to record the number of times each data segment is referenced by the files.

As mentioned above when describing block 320 of FIG. 3, in some embodiments, when determining the deduplication ratio for a file, computing device 120 may also consider the number of duplications of each data segment within the file, so as to determine the deduplication ratio of the file more accurately. Such an embodiment will be described below in detail with reference to FIG. 5.

Figure 5:
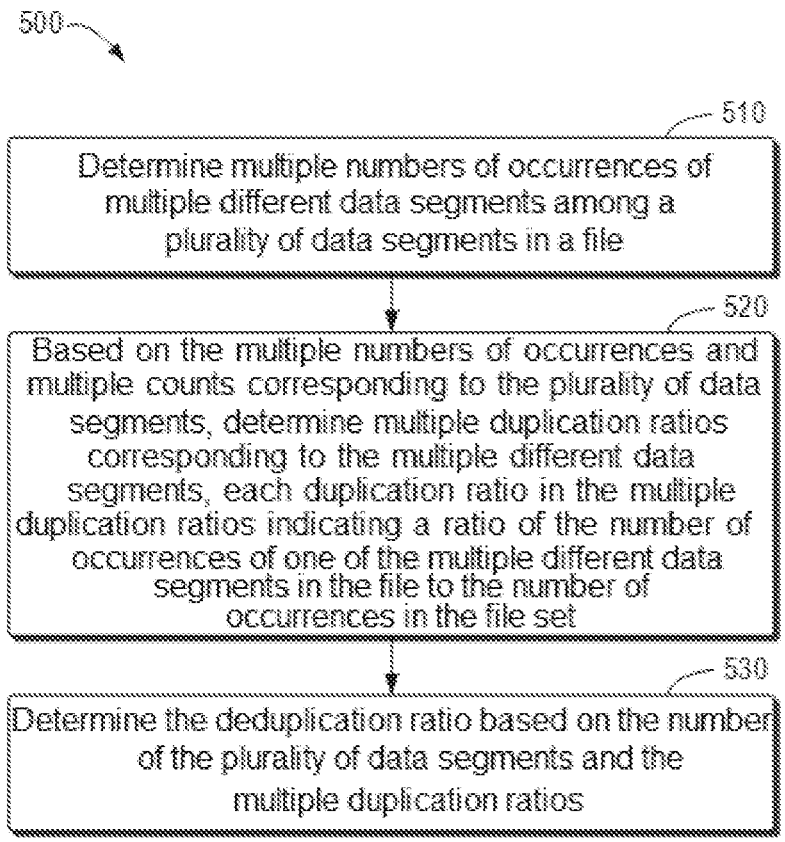
FIG. 5 illustrates a flowchart of an example process for determining a deduplication ratio of a file according to an embodiment of the present disclosure.

FIG. 5 illustrates a flowchart of example process 500 for determining the deduplication ratio of a file according to an embodiment of the present disclosure. In some embodiments, process 500 may be implemented by computing device 120 in storage system 110, for example, by a processor or a processing unit of computing device 120, or by various functional modules of computing device 120. In other embodiments, process 500 may also be implemented by a computing device independent of storage system 110, or may be implemented by other units or modules in storage system 110.

For ease of discussion and without loss of generality, process 500 will be described below with reference to FIGS. 1 and 2 using first file 210, second file 220, and third file 230 as examples. It should be understood, however, that embodiments of the present disclosure are not limited to any particular file, but are equally applicable to any file including data segments.

At 510, in a case where a certain file includes a plurality of data segments, computing device 120 may determine multiple numbers of occurrences of multiple different data segments, among the plurality of data segments, in the file. For example, in the example of FIG. 2, computing device 120 may determine that the multiple numbers of occurrences of multiple different data segments, among the plurality of data segments 250-1 to 250-6 of first file 210, in first file 210 are {1, 1, 1, 1, 1, 1}, the multiple numbers of occurrences of multiple different data segments, among the plurality of data segments 250-1 to 250-5 and 250-7 of second file 220, in second file 220 are {1, 1, 1, 1, 1, 1}, and the multiple numbers of occurrences of multiple different data segments, among the plurality of data segments 250-8 to 250-12 of third file 230, in third file 230 are {1, 1, 1, 1, 1}.

It should be noted that in the example of FIG. 2, it has been assumed that the plurality of data segments included in first file 210, second file 220, and third file 230 are different data segments from each other, so the number of occurrences of each data segment in the files is 1. However, in some cases, a certain file in file set 135 may include multiple data segments that are the same as each other. That is, a certain data segment may be duplicated multiple times in a file. In this case, when determining the deduplication ratio of the file, considering the number of duplications of the data segment inside the file will help to determine the deduplication ratio of the file more accurately.

For example, assuming that file set 135 further includes a fourth file (not shown). The fourth file includes 10 data segments, of which the first five data segments are the same, while the other five data segments are unique in file set 135. In addition, assuming that file set 135 further includes a fifth file (not shown). The fifth file also has 10 data segments, of which the first three data segments are the same as the five identical data segments in the fourth file, and the other seven data segments are unique in file set 135. In addition, it is further assumed that all data segments of the fourth file and the fifth file are different from the data segments of first file 210, second file 220, and third file 230.

Under such an assumption, computing device 120 may determine that the multiple numbers of occurrences of the multiple different data segments, among the plurality of data segments of the fourth file, in the fourth file are {5, 1, 1, 1, 1, 1}. This is because the first five data segments of the fourth file are the same data segment, and the numbers of occurrences of the first five data segments in the file may be counted only once. Similarly, the multiple numbers of occurrences of the multiple different data segments, among the plurality of data segments of the fifth file, in the fifth file are {3, 1, 1, 1, 1, 1, 1, 1}. This is because the first three data segments of the fifth file are the same data segment, and the numbers of occurrences of the first three data segments in the file may be counted only once.

At 520, based on the multiple numbers of occurrences of different data segments of the file in the file and the respective counts corresponding to all data segments of the file determined in block 310 of example method 300, computing device 120 may determine a plurality of duplication ratios corresponding to the multiple different data segments, where each duplication ratio may indicate a ratio of the number of occurrences of one data segment among the different data segments in the file to the number of occurrences of the data segment in file set 135.

For example, in the example of FIG. 2, data segments 250-1 to 250-6 included in first file 210 are all different from each other. Therefore, based on the numbers of occurrences of data segments 250-1 to 250-6 in first file 210 being {1, 1, 1, 1, 1, 1}, and the counts corresponding to data segments 250-1 to 250-6 in file set 135 being {2, 2, 2, 2, 2, 1}, computing device 120 may determine that the duplication ratios corresponding to data segments 250-1 to 250-6 are {1/2, 1/2, 1/2, 1/2, 1/2, 1}.

Similarly, data segments 250-1 to 250-5 and 250-7 included in second file 220 are all different from each other. Therefore, based on the numbers of occurrences of data segments 250-1 to 250-5 and 250-7 in second file 220 being {1, 1, 1, 1, 1, 1} and the counts corresponding to data segments 250-1 to 250-5 and 250-7 in file set 135 being {2, 2, 2, 2, 2, 1}, computing device 120 may determine that the duplication ratios corresponding to data segments 250-1 to 250-5 and 250-7 are {1/2, 1/2, 1/2, 1/2, 1/2, 1}.

Similarly, data segments 250-8 to 250-12 included in third file 230 are different from each other. Therefore, based on the numbers of occurrences of data segments 250-8 to 250-12 in third file 230 being {1, 1, 1, 1, 1}, and the counts corresponding to data segments 250-8 to 250-12 in file set 135 being {1, 1, 1, 1, 1}, computing device 120 may determine that the duplication ratios corresponding to data segments 250-8 to 250-12 are {1, 1, 1, 1, 1}.

Unlike first file 210, second file 220, and third file 230, the first five data segments included in the fourth file are the same and are the same as the first three data segments of the fifth file. Therefore, based on the numbers of occurrences of data segments in the fourth file being {5, 1, 1, 1, 1, 1}, and the counts corresponding to the data segments of the fourth file in file set 135 being {8, 8, 8, 8, 8, 1, 1, 1, 1, 1}, computing device 120 may determine that the duplication ratios corresponding to the different data segments of the fourth file are {5/8, 1, 1, 1, 1, 1}.

Similarly, the first three data segments included in the fifth file are the same and are the same as the first five data segments of the fourth file. Therefore, based on the numbers of occurrences of data segments in the fifth file being {3, 1, 1, 1, 1, 1, 1}, and the counts corresponding to the data segments of the fifth file in file set 135 being {8, 8, 8, 1, 1, 1, 1, 1, 1}, computing device 120 may determine that the duplication ratios corresponding to the different data segments of the fifth file are {3/8, 1, 1, 1, 1, 1, 1}.

At 530, computing device 120 may determine the deduplication ratio of a file based on the number of data segments of the file and the duplication ratios of different data segments of the file. For example, in order to make the deduplication ratio between different files with different numbers of data segments comparable, the sum of the duplication ratios of the data segments of the files can be normalized to one data segment. More specifically, computing device 120 may determine the deduplication ratio of a file by dividing a sum of duplication ratios of different data segments of the file by the number of data segments and then calculating the reciprocal. In other words, the deduplication ratio of a file can be expressed by a total number of logical data segments (regardless of whether the data segments are the same) divided by a total number of allocated physical data segments, where the total allocated physical data segment is the sum of duplication ratios of the different data segments of the file.

Therefore, continuing to discuss the example described above, computing device 120 may determine the deduplication ratio of first file 210 as 6/(7/2)=12/7, and determine the deduplication ratio of second file 220 as 6/(7/2)=12/7, determine the deduplication ratio of third file 230 as 5/5=1, determine the deduplication ratio of the fourth file as 10/(5/8+5)=16/9, and determine the deduplication ratio of the fifth file as 10/(3/8+7)=80/59.

It can be seen that by using example process 500 to determine the deduplication ratio of a file, computing device 120 may take into account the number of occurrences of a data segment within a file when determining the deduplication ratio of the file, so that the deduplication ratio of a file with duplicate data segments can be measured more accurately and the accuracy of the determined deduplication ratio of the file can be further improved.

As mentioned above when describing block 340 of FIG. 3, in some embodiments, when a file is migrated from local storage device 130 to remote storage device 140, the metadata of the file may be stored in both local storage device 130 and remote storage device 140. Such an embodiment will be described below in detail with reference to FIG. 6.

Figure 6:
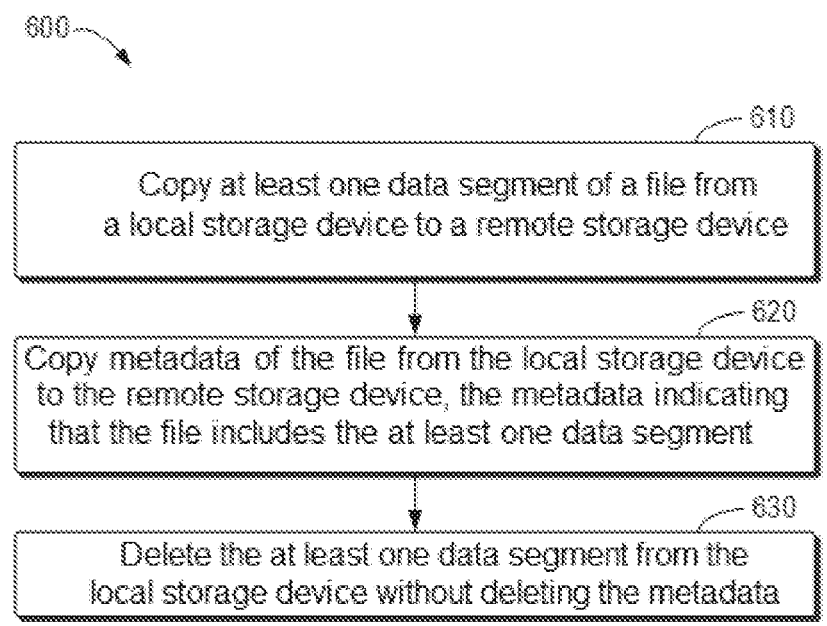
FIG. 6 illustrates a flowchart of an example process for migrating a file from a local storage device to a remote storage device according to an embodiment of the present disclosure.

FIG. 6 illustrates a flowchart of example process 600 for migrating a file from local storage device 130 to remote storage device 140 according to an embodiment of the present disclosure. In some embodiments, process 600 may be implemented by computing device 120 in storage system 110, for example, by a processor or a processing unit of computing device 120, or by various functional modules of computing device 120. In other embodiments, process 600 may also be implemented by a computing device independent of storage system 110, or may be implemented by other units or modules in storage system 110.

For ease of discussion and without loss of generality, process 600 will be described below with reference to FIGS. 1 and 2 using first file 210, second file 220, and third file 230 as examples. It should be understood, however, that embodiments of the present disclosure are not limited to any particular file, but are equally applicable to any file including data segments.

At 610, computing device 120 may copy one or more data segments of the to-be-migrated file from local storage device 130 to remote storage device 140. For example, in the example of FIG. 2, assuming that computing device 120 determines to migrate first file 210 to remote storage device 140, computing device 120 may copy the data segments 250-1 to 250-6 of first file 210 from local storage device 130 to remote storage device 140. Similarly, assuming that computing device 120 determines to migrate second file 220 to remote storage device 140, computing device 120 may copy the data segments 250-1 to 250-5 and 250-7 of second file 220 from local storage device 130 to remote storage device 140. Similarly, assuming that computing device 120 determines to migrate third file 230 to remote storage device 140, computing device 120 may copy the data segments 250-8 to 250-12 of third file 230 from local storage device 130 to remote storage device 140.

At 620, computing device 120 may copy, from local storage device 130 to remote storage device 140, the metadata of the to-be-migrated file, where the metadata may indicate which data segments the file includes. For example, in the example of FIG. 2, assuming that computing device 120 determines to migrate first file 210 to remote storage device 140, computing device 120 may copy the metadata of first file 210 from local storage device 130 to remote storage device 140, where the metadata of first file 210 may indicate that first file 210 includes data segments 250-1 to 250-6.

Similarly, assuming that computing device 120 determines to migrate second file 220 to remote storage device 140, computing device 120 may copy the metadata of second file 220 from local storage device 130 to remote storage device 140, where the metadata of second file 220 may indicate that second file 220 includes data segments 250-1 to 250-5 and 250-7. Similarly, assuming that computing device 120 determines to migrate third file 230 to remote storage device 140, computing device 120 may copy the metadata of third file 230 from local storage device 130 to remote storage device 140, the metadata of third file 230 may indicate that third file 230 includes data segments 250-8 to 250-12.

At 630, computing device 120 may delete from local storage device 130 the data segments of the to-be-migrated file without deleting the metadata of the file. For example, in the example of FIG. 2, assuming that computing device 120 determines to migrate first file 210 to remote storage device 140, computing device 120 may delete data segments 250-1 to 250-6 of first file 210 from local storage device 130 without deleting the metadata of first file 210. Similarly, assuming that computing device 120 determines to migrate second file 220 to remote storage device 140, computing device 120 may delete the data segments 250-1 to 250-5 and 250-7 of second file 220 from local storage device 130 without deleting the metadata of second file 220. Similarly, assuming that computing device 120 determines to migrate third file 230 to remote storage device 140, computing device 120 may delete the data segments 250-8 to 250-12 of third file 230 from local storage device 130 without deleting the metadata of third file 230.

It should be noted that, in some embodiments, computing device 120 may not delete from local storage device 130 the overlapping data segments between the migrated file and other unmigrated files, thereby not affecting access to the unmigrated files. However, it is also feasible for computing device 120 to completely delete all data segments of the migrated file from local storage device 130. In this case, when it is necessary to access an unmigrated file that have overlapping data segments with the migrated file, based on the information about the unmigrated file, computing device 120 may restore the data segments deleted from local storage device 130, or computing device 120 may access these data segments from the remote storage device 140.

By using example process 600 to migrate a file from local storage device 130 to remote storage device 140, the metadata of the file (particularly the information about the relationship between the data segments) may be retained in local storage device 130. Therefore, when it is necessary to retrieve or obtain data segment information related to the file, computing device 120 can quickly and conveniently obtain the information from local storage device 130 without accessing remote storage device 140. In addition, the metadata of the file retained in local storage device 130 may also implicitly indicate that the file is stored in remote storage device 140. In some scenarios, this will simplify a further operation of computing device 120 on the file, for example, a storage operation on an incremental backup file of the file, etc. An example scenario after the file is migrated to remote storage device 140 according to example process 600 will be described below with reference to FIG. 7.

Figure 7:
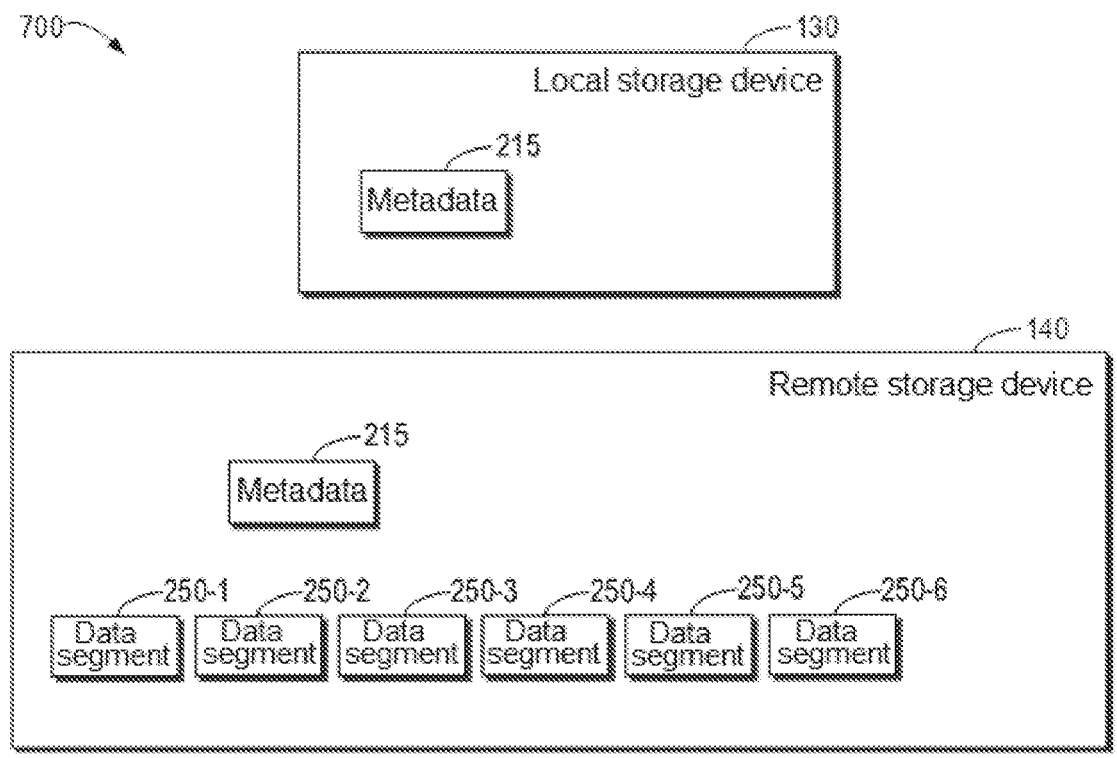
FIG. 7 illustrates an example of content stored by a local storage device and content stored by a remote storage device after a file is migrated from the local storage device to the remote storage device according to an embodiment of the present disclosure.

FIG. 7 illustrates example 700 of content stored by local storage device 130 and content stored by remote storage device 140 after a file is migrated from local storage device 130 to remote storage device 140 according to an embodiment of the present disclosure. For ease of discussion and without loss of generality, example 700 uses first file 210 as an example to describe the content stored by local storage device 130 and the content stored by remote storage device 140 after the migration of first file 120 is completed. It should be understood, however, that embodiments of the present disclosure are not limited to any particular file, but are equally applicable to any file including data segments.

As shown in FIG. 7, after first file 210 is migrated from local storage device 130 to remote storage device 140, remote storage device 140 stores data segments 250-1 to 250-6 of first file 210 and metadata 215 of first file 210, where metadata 215 may indicate that first file 210 includes data segments 250-1 to 250-6. In local storage device 130, data segments 250-1 to 250-6 of first file 210 have been deleted, but metadata 215 of first file 210 is retained in local storage device 130. As indicated above, in this way, a storage operation for an incremental backup file of first file 210 can be optimized. Such an example will be described below in detail with reference to FIG. 9.

Generally, metadata 215 of first file 210 may have any suitable form as long as metadata 215 can indicate data segments 250-1 to 250-6 that are included in first file 210. For example, metadata 215 of first file 210 may record respective identifiers of data segments 250-1 to 250-6. For another example, metadata 215 of first file 210 may record a joint identifier of data segments 250-1 to 250-6, that is, the joint identifier indicates a combination of data segments 250-1 to 250-6. In other embodiments, data segments 250-1 to 250-6 may be organized in a form of a tree-like data structure (e.g., Merkel tree) to form first file 210. Such an embodiment and an example of metadata 215 of first file 210 will be described below in detail with reference to FIG. 8.

Figure 8:
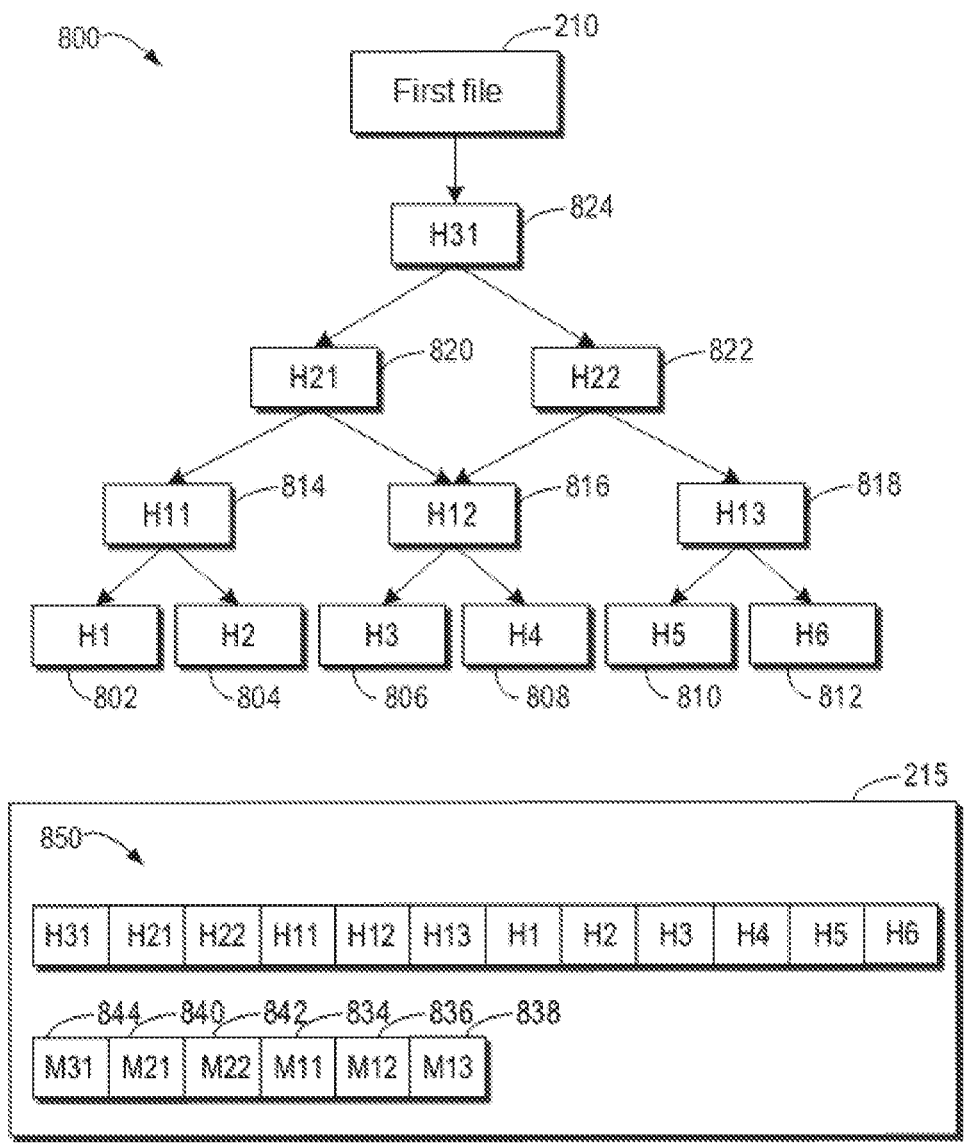
FIG. 8 illustrates an example data structure of a file and example content of metadata according to an embodiment of the present disclosure.

FIG. 8 illustrates example data structure 800 of a file and example content of metadata 215 according to an embodiment of the present disclosure. For ease of discussion and without loss of generality, FIG. 8 uses example structure 800 of first file 210 as an example to describe the organization structure of the file and the content of metadata. It should be understood, however, that embodiments of the present disclosure are not limited to any particular file or data structure, but are equally applicable to any file including data segments.

As shown in FIG. 8, identifiers (e.g., hash values) of data segments 250-1 to 250-6 of first file 210 may be represented as H1 802, H2 804, H3 806, H4 808, H5 810, and H6 812, respectively. Identifier (e.g., hash value) H11 814 may be generated from H1 802 and H2 804, identifier (e.g., hash value) H12 816 may be generated from H3 806 and H4 808, and identifier (e.g., hash value) H13 818 may be generated from H5 810 and H6 812.

In addition, identifier (e.g., hash value) H21 820 may be generated from H11 814 and H12 816, and identifier (e.g., hash value) H22 822 may be generated from H12 816 and H13 818. Further, an identifier (e.g., hash value) H31 824 may be generated from H21 820 and H22 822. Therefore, first file 210 may eventually be identified or recognized using identifier H31 824.

In example structure 800 depicted in FIG. 8, the tree-like data structure of first file 210 may be a Merkel tree structure, which may be represented by a fingerprint index (simply referred to as a fingerprint) of the Merkel tree. For example, fingerprint index 850 of first file 210 in this example may be expressed as "H31, H21, H22, H11, H12, H13, H1, H2, H3, H4, H5, H6." The metadata content corresponding to H31 824, H21 820, H22 822, H11 814, H12 816, and H13 818 in fingerprint index 850 may be expressed as M31 844, M21 840, M22 842, M11 834, M12 836, and M13 838, respectively.

That is, in some embodiments, each file in file set 135 may be represented as a Merkel tree composed of metadata segments and atomic data segments (that is, the data segments of the file described above), and each metadata segment and data segment in the Merkel tree may be represented as a hash fingerprint, and the hash fingerprint may be mapped to a physical container (i.e., a physical storage space that stores data content or metadata content) through a fingerprint index.

Therefore, through fingerprint index 850 and corresponding metadata segments M31 844, M21 840, M22 842, M11 834, M12 836, and M13 838, computing device 120 may completely determine tree structure 800 of first file 210. Therefore, as further shown in FIG. 8, in the example where first file 210 has tree structure 800, metadata 215 of first file 210 may include fingerprint index 850 of first file 210 and corresponding metadata segments M31 844, M21 840, M22 842, M1 1 834, M12 836, and M13 838.

That is, after first file 210 is migrated from local storage device 130 to remote storage device 140, all physical containers (i.e., data segments 250-1 to 250-6) of first file 210 for atomic data segments may be migrated into remote storage device 140. Since the atomic data segments usually constitute more than 95% of the physical data of the file, migrating all of them to remote storage device 140 may largely save the storage space of local storage device 130. In contrast, copies of fingerprint index 850 of first file 210 and corresponding physical containers of the metadata segments (e.g., the physical storage space of the metadata) may be retained in both local storage device 130 and remote storage device 140.

As mentioned above when describing FIG. 7, by retaining metadata 215 of first file 210 in local storage device 130, subsequent storage operations for an incremental backup file of first file 210 may be optimized. The following briefly introduces the file incremental backup technology related to the embodiments of the present disclosure.

At present, the file virtual synthesis technology and fast copy and overwrite technology based on the incremental backup technology have been widely used in modern data protection systems. Compared with conventional full incremental backup, the virtual synthetic full backup technology can make every backup session logically complete, even if only incremental data needs to be processed and stored. The key point of the virtual synthesis complete backup technology is the virtual synthesis technology. With this technology, for a newly incoming backup file to storage system 110, computing device 120 may detect that a base backup file (also called the base file or parent backup file) of the newly incoming backup file already exists in local storage device 130, and only the new data or changed data of the new backup file relative to the base backup file needs to be appended or overwritten to the base backup file. In general, the ratio of new or changed data is usually low, for example, less than 5%.

Therefore, during the virtual synthesis of the file, computing device 120 may find the base backup file of the incremental backup file in local storage device 130. For the unchanged data segments of the incremental backup file relative to the base backup file, copies of these data segments may be directly attached to the incremental backup file from the base backup file without actual data writing on the storage device. In contrast, the changed data segments or new data segments of the incremental backup file relative to the base backup file need to be written to the storage device.

However, according to an embodiment of the present disclosure, some files in local storage device 130 may have been migrated to remote storage device 140, and these migrated files may be the base files of the newly incoming incremental backup files. If computing device 120 does not find its base file in local storage device 130 with regard to the newly incoming incremental backup file, computing device 120 may need to call out the base file from remote storage device 140, or may need to rewrite all data segments of the newly incoming incremental backup file to local storage device 130. This means that two almost identical copies of the data segments will consume the storage space of local storage device 130 and remote storage device 140 at the same time, resulting in an increase in data storage costs. In this regard, in some embodiments, by reasonably handling the relationship between the incremental backup files and the base backup file already existing in remote storage device 140, the above-described dual storage scenario may be advantageously avoided. Such an embodiment will be described below in detail with reference to FIG. 9.

Figure 9:
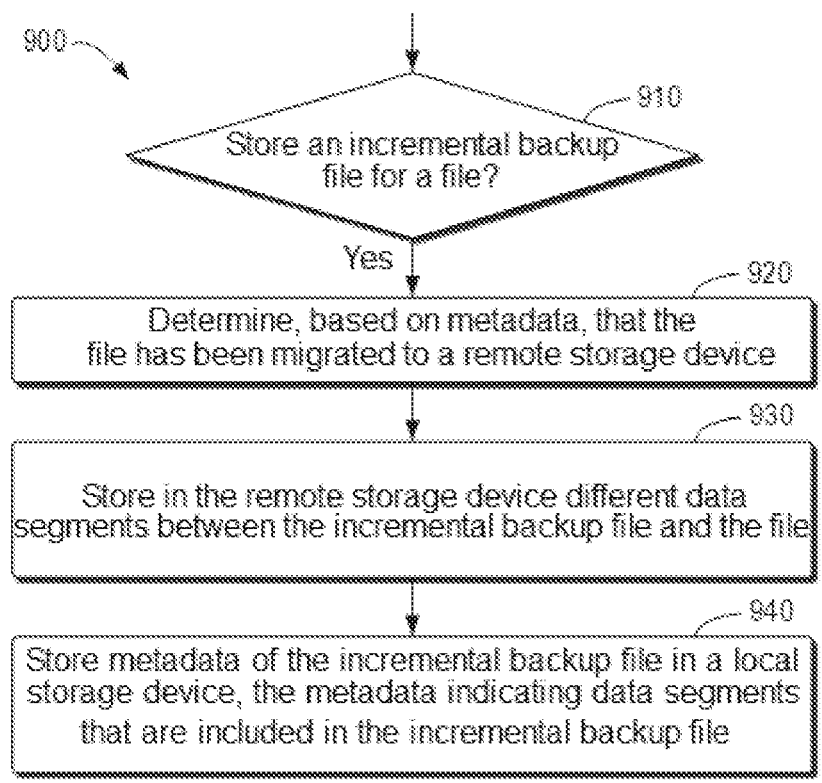
FIG. 9 illustrates a flowchart of an example process for storing an incremental backup file of a file according to an embodiment of the present disclosure.

FIG. 9 illustrates a flowchart of example process 900 for storing an incremental backup file of a file according to an embodiment of the present disclosure. In some embodiments, process 900 may be implemented by computing device 120 in storage system 110, for example, by a processor or a processing unit of computing device 120, or by various functional modules of computing device 120. In other embodiments, process 900 may also be implemented by a computing device independent of storage system 110, or may be implemented by other units or modules in storage system 110.

For ease of discussion and without loss of generality, process 900 will be described below with reference to FIGS. 1 and 2 using second file 220 as an incremental backup file of first file 210 as an example. It should be understood, however, that embodiments of the present disclosure are not limited to any particular file, but are equally applicable to any file including data segments. In addition, in the description about FIG. 9, it is assumed that the base file to which the incremental backup file is directed has been migrated to remote storage device 140. For example, more specifically, unlike the scenario in which first file 210 and second file 220 depicted in FIG. 2 have been stored in local storage device 130, with regard to FIG. 9, it is assumed here that first file 210 is initially stored in local storage device 130, and currently has been migrated to remote storage device 140, while second file 220, as the incremental backup file of first file 210, has not been previously stored in local storage device 130, and is currently generated and needs to be stored.

At 910, computing device 120 may determine whether to store the incremental backup file for the file. It should be noted that, depending on a specific implementation of storage system 110, computing device 120 may determine, in different ways, whether to store the incremental backup file for the file. For example, in some embodiments, client terminal 150 may directly send a request to storage system 110 to store an incremental backup file for a certain file. Therefore, computing device 120 may determine that the file to be stored is an incremental backup file of a certain file based on the instruction of client terminal 150. In other embodiments, client terminal 150 may only send a request for storing a file to storage system 110, and computing device 120 may determine that the file to be stored is an incremental backup file of a certain file by comparing the file to be stored with the stored files.

For example, in the example of FIG. 2, first file 210 and second file 220 include overlapping data segments 250-1 to 250-5, while the two files differ only in data segments 250-6 and 250-7. Therefore, regardless of the method, computing device 120 may determine that second file 220 to be stored is the incremental backup file of first file 210.

At 920, if computing device 120 determines that the incremental backup file for the base file is to be stored, computing device 120 may determine, based on the metadata of the base file, that the base file has been migrated to remote storage device 140. For example, in the example of FIG. 7, although first file 210, as the base file, has been migrated to remote storage device 140, metadata 215 of first file 210 is still stored in local storage device 130. Therefore, based on metadata 215 in local storage device 130, computing device 120 may know that first file 210 has been migrated to remote storage device 140 instead of not existing.

It will be understood that since the incremental backup file and the base file have some common data segments, and these data segments have been migrated to remote storage device 140 along with the base file, computing device 120 may also store the incremental backup file to remote storage device 140, this can take advantages of the incremental backup technology and the deduplication technology, thereby saving physical storage space for storing the incremental backup file. More specifically, by storing the incremental backup file to remote storage device 140, computing device 120 may avoid rewriting the data segments common to the incremental backup file and the base file.

Therefore, at 930, computing device 120 may store in remote storage device 140 the different data segments between the incremental backup file and the base file. That is, when the new incremental backup file reaches storage system 110, computing device 120 may find that its base file has been migrated to remote storage device 140, so the new incremental backup file may be directly migrated to remote storage device 140 rather than being stored in local storage device 130.

This is reasonable because most of the content of the incremental backup file (usually for virtual synthesis, the rate of change is less than 5%) has been migrated to remote storage device 140 along with its base file. With the help of copies of the fingerprint index and metadata of the base file remaining in local storage device 130 and based on the virtual synthesis technology, computing device 120 does not need to traverse remote storage device 140 to read unchanged data segments of the incremental backup file relative to the base file, which would be costly. Alternatively, the fingerprint index and metadata of the base file in local storage device 130 may guide a virtual synthesis operation to attach the unchanged data segments of the incremental backup file relative to the base file to the incremental backup file, as if these data segments were still in local storage device 130.

The only cost that may be required is to migrate to remote storage device 140 a small amount (e.g., less than 5%) of new or changed data of the incremental backup file relative to the base file, which is cost-effective. In addition, by continuously moving subsequent similar multiple incremental backup files to remote storage device 140, the data deduplication ratios of local storage device 130 and remote storage device 140 may be improved. It should be noted that, similar to the virtual synthesis technology, the embodiments of the present disclosure can also be similarly applied to the incremental backup technology using fast copy and overwrite.

Continuing with the example described above, in the example where second file 220 to be stored is the incremental backup file of first file 210, the data segment of second file 220 that is different from the data segments of first file 210 is data segment 250-7. Therefore, in the case where first file 210 has been stored in remote storage device 140, in order to store second file 220 to remote storage device 140, computing device 120 may store data segment 250-7 in remote storage device 140.

At 940, computing device 120 may store the metadata of the incremental backup file in remote storage device 140, where the metadata of the incremental backup file may indicate the data segments that are included in the incremental backup file. For example, in the example where second file 220 is the incremental backup file of first file 210, computing device 120 may store the metadata of second file 220 in remote storage device 140 to indicate that second file 220 includes data segments 250-1 to 250-5 and 250-7.

By using example process 900 to store incremental backup files, computing device 120 can ensure that base files with a high overlapping level and their incremental backup files are stored in the same storage device (e.g., remote storage device 140), thereby improving the storage efficiency and storage space utilization of storage system 110, and reducing the storage cost of incremental backup files. An example scenario after the incremental backup file is stored in remote storage device 140 according to example process 900 will be described below with reference to FIG. 10.

Figure 10:
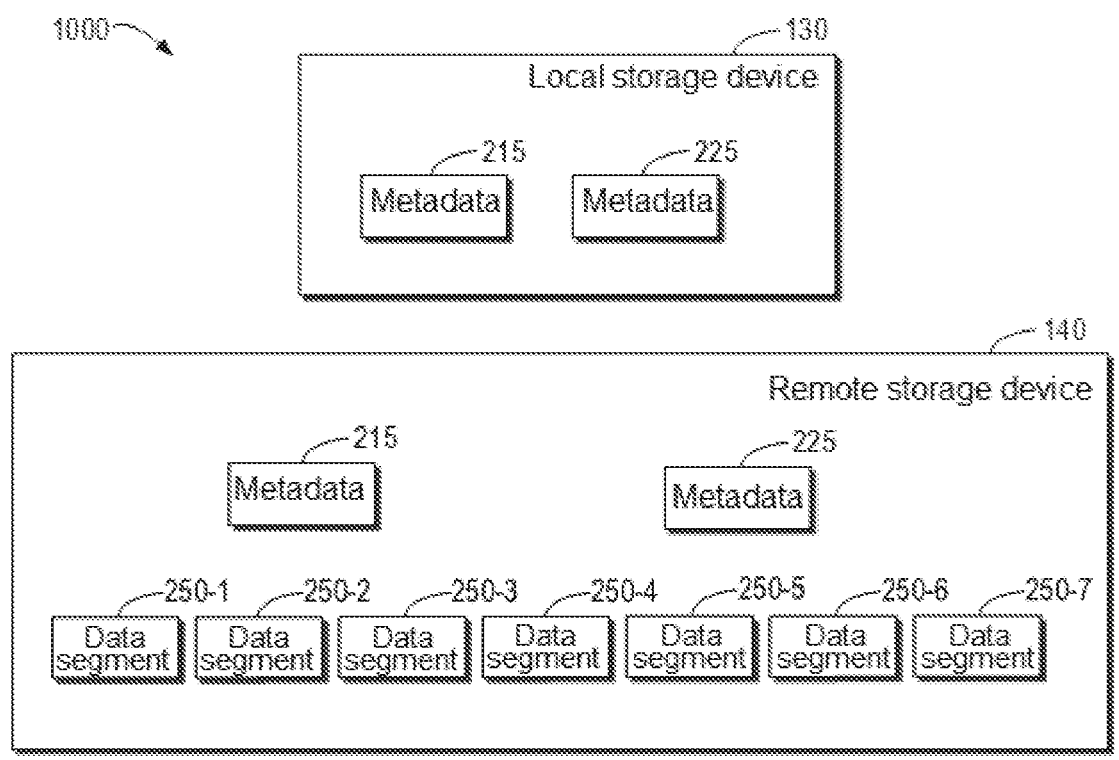
FIG. 10 illustrates an example of content stored by a local storage device and content stored by a remote storage device after an incremental backup file is stored in the remote storage device according to an embodiment of the present disclosure.

FIG. 10 illustrates example 1000 of content stored by local storage device 130 and content stored by remote storage device 140 after incremental backup file 220 is stored in remote storage device 140 according to an embodiment of the present disclosure. For ease of discussion and without loss of generality, example 1000 uses first file 210 and second file 220 as an example to describe the content stored by local storage device 130 and the content stored by remote storage device 140 after the migration of first file 210 and second file 220 has been completed. It should be understood, however, that embodiments of the present disclosure are not limited to any particular file, but are equally applicable to any file including data segments.

As shown in FIG. 10, after second file 220, as the incremental backup file of first file 210, is stored in remote storage device 140, remote storage device 140 stores data segments 250-1 to 250-5 common to first file 210 and second file 220, data segment 250-6 unique to first file 210, and data segment 250-7 unique to second file 220. In addition, remote storage device 140 also stores metadata 215 of first file 210 and metadata 225 of second file 220. In local storage device 130, the respective data segments of first file 210 and second file 220 may not be stored, but metadata 215 of first file 210 and metadata 225 of second file 220 may be stored in local storage device 130.

Similar to metadata 215 of first file 210, metadata 225 of second file 220 may also have any suitable form, as long as metadata 225 can indicate data segments 250-1 to 250-5 and 250-7 that are included in second file 220. For example, metadata 225 of second file 220 may record respective identifiers of data segments 250-1 to 250-5 and 250-7. For another example, metadata 225 of second file 220 may record a joint identifier of data segments 250-1 to 250-5 and 250-7, that is, the joint identifier indicates a combination of data segments 250-1 to 250-5 and 250-7. In addition, in the embodiment where data segments 250-1 to 250-6 form first file 210 through tree structure 800, data segments 250-1 to 250-5 and 250-7 may also be organized in the form of a tree-like data structure (e.g. the Merkel tree) to form second file 220. Such an embodiment and an example of the metadata 225 of second file 220 will be described below in detail with reference to FIG. 11.

Figure 11:
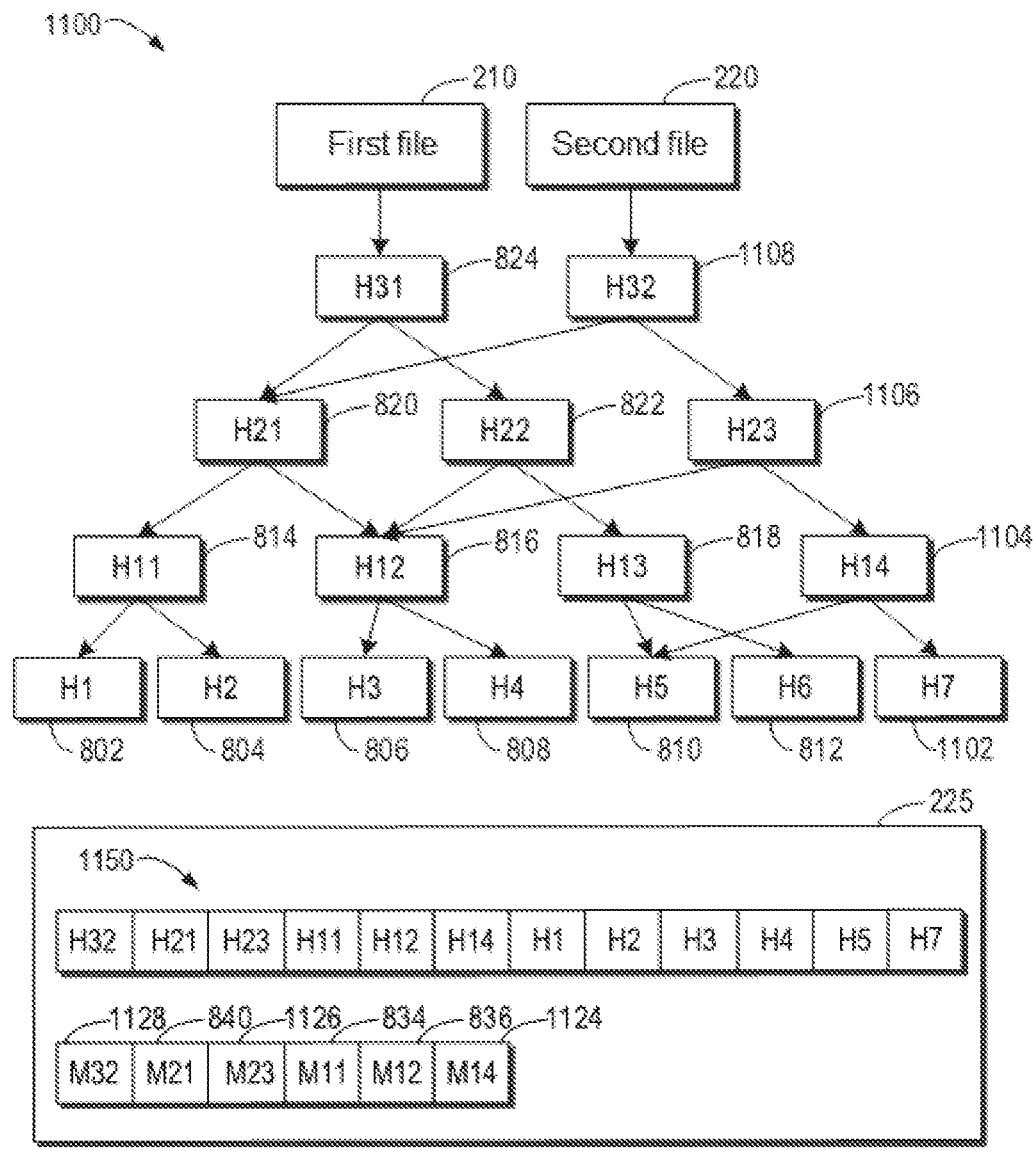
FIG. 11 illustrates an example data structure of an incremental backup file and example content of metadata according to an embodiment of the present disclosure.

FIG. 11 illustrates an example data structure of an incremental backup file and example content of metadata 225 according to an embodiment of the present disclosure. For ease of discussion and without loss of generality, FIG. 11 uses example structure 1100 of first file 210 and second file 220 as an example to describe the organization structure of the files and the content of metadata. It should be understood, however, that embodiments of the present disclosure are not limited to any particular file or data structure, but are equally applicable to any file including data segments.

As shown in FIG. 11, example structure 1100 and example structure 800 of FIG. 8 are the same with respect to first file 210. The difference between the two is that the identifier of data segment 250-7 of second file 220 (e.g., hash value) may be expressed as H7 1102, identifier (e.g., hash value) H14 1104 may be generated from H5 810 and H7 1102, identifier (e.g., hash value) H23 1106 may be generated from H12 816 and H14 1104, and identifier (e.g., hash value) H32 1108 may be generated from H21 820 and H23 1106. Therefore, second file 210 may eventually be identified or recognized using identifier H32 1108.

In the example structure 1100 depicted in FIG. 11, the tree-like data structure of second file 220 may be a Merkel tree structure, which may be represented by a fingerprint index (simply referred to as a fingerprint) of the Merkel tree. For example, fingerprint index 1150 of second file 220 in this example may be expressed as "H32, H21, H23, H11, H12, H14, H1, H2, H3, H4, H5, H7." The metadata contents corresponding to H32 1108, H21 820, H23 1106, H11 814, H12 816, and H14 1104 in fingerprint index 1150 may be expressed as M32 1128, M21 840, M23 1126, M11 834, M12 836, and M14 1124, respectively.

Therefore, through fingerprint index 1150 and corresponding metadata segments M32 1128, M21 840, M23 1126, M11 834, M12 836, and M14 1124, computing device 120 may completely determine the tree structure of second file 220. Therefore, as further shown in FIG. 11, in the example of tree structure 1100 common to first file 210 and second file 220, metadata 225 of second file 220 may include fingerprint index 1150 of second file 220 and corresponding metadata segments M32 1128, M21 840, M23 1126, M11 834, M12 836, and M14 1124.

Figure 12:
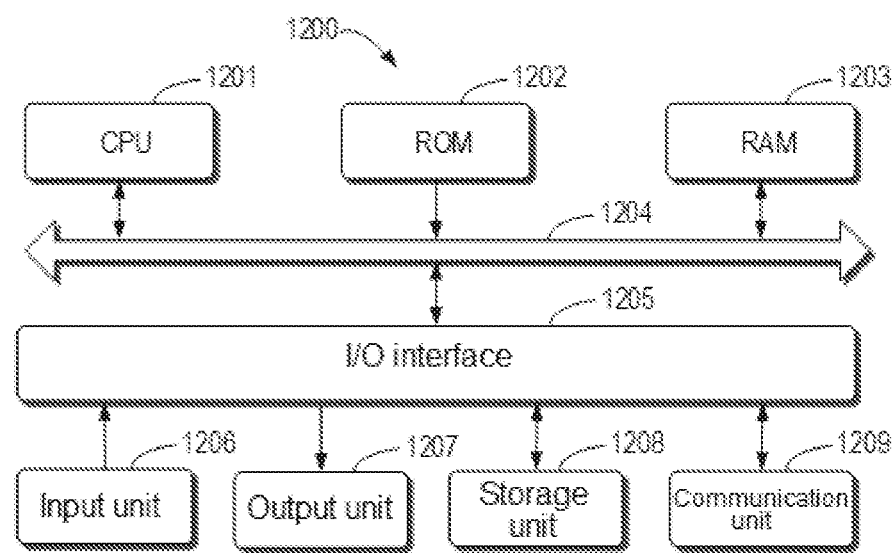
FIG. 12 illustrates a schematic block diagram of a device that can be used to implement embodiments of the present disclosure.

FIG. 12 schematically illustrates a block diagram of device 1200 that can be used to implement embodiments of the present disclosure. In some embodiments, device 1200 may be an electronic device, which may be used to implement computing device 120 in FIG. 1. As shown in FIG. 12, device 1200 includes central processing unit (CPU) 1201 that can perform various appropriate actions and processes according to computer program instructions stored in read-only memory (ROM) 1202 or computer program instructions loaded from storage unit 1208 into random access memory (RAM) 1203. In RAM 1203, various programs and data necessary for the operation of device 1200 may also be stored. CPU 1201, ROM 1202, and RAM 1203 are connected to one another through bus 1204. Input/output (I/O) interface 1205 is also connected to bus 1204.

A plurality of components in device 1200 are connected to I/O interface 1205 and the components include: input unit 1206, such as a keyboard and a mouse; output unit 1207, such as various types of displays and speakers; storage unit 1208, such as a magnetic disk and an optical disk; and communication unit 1209, such as a network card, a modem, and a wireless communication transceiver. Communication unit 1209 allows device 1200 to exchange information/data with other devices through a computer network such as the Internet and/or various telecommunication networks.

The various processes and processing procedures described above, such as example methods or processes 300, 400, 500, 600, and 900, may be performed by processing device 1201. For example, in some embodiments, example methods or processes 300, 400, 500, 600, and 900 may be implemented as computer software programs that are tangibly included in a machine-readable medium, such as storage unit 1208. In some embodiments, part or all of the computer programs may be loaded and/or installed on device 1200 via ROM 1202 and/or communication unit 1209. When a computer program is loaded into RAM 1203 and executed by CPU 1201, one or more steps of example methods or processes 300, 400, 500, 600, and 900 described above may be performed.

As used herein, the term "including" and similar terms should be understood to be open-ended, i.e., "including but not limited to." The term "based on" should be understood as "based at least in part on." The term "one embodiment" or "this embodiment" should be understood as "at least one embodiment." The terms "first," "second," etc. may refer to different or the same objects. Other explicit and implicit definitions may also be included in the present disclosure.

As used herein, the term "determining" encompasses a variety of actions. For example, "determining" may include operations, calculations, processing, exporting, surveying, searching (e.g., searching in a table, a database, or another data structure), and identifying. In addition, "determining" may include receiving (e.g., receiving information) and accessing (e.g., accessing data in a memory). In addition, "determining" may include analysis, selection, picking, and establishment.

It should be noted that the embodiments of the present disclosure may be implemented by hardware, software, or a combination of software and hardware. The hardware part may be implemented with dedicated logic; the software part may be stored in a memory and executed by an appropriate instruction execution system, such as a microprocessor or specially designed hardware. Those skilled in the art may understand that the above-mentioned devices and methods may be implemented by using computer-executable instructions and/or being contained in processor control codes, for example, provided on a programmable memory or a data carrier such as an optical or electronic signal carrier.

In addition, although the operations of the method of the present disclosure are described in a specific sequence in the drawings, this does not require or imply that the operations must be performed in the specific sequence, or all the operations shown must be performed to achieve the desired results. Instead, the execution sequence of the steps depicted in the flowcharts may be changed. Additionally or alternatively, certain steps may be omitted, multiple steps may be combined into one step for execution, and/or one step may be decomposed into multiple steps for execution. It should also be noted that the features and functions of two or more devices according to the present disclosure may be embodied in one device. Conversely, the features and functions of one device described above may be further divided into multiple devices to be more specific.

Although the present disclosure has been described with reference to several specific embodiments, it should be understood that the present disclosure is not limited to the disclosed specific embodiments. The present disclosure is intended to cover various modifications and equivalent arrangements included within the spirit and scope of the appended claims.

The invention claimed is:

1. A storage management method, comprising:
   determining at least one count corresponding to at least one data segment of a file in a file set, the file set being stored in a local storage device, the at least one count indicating a number of occurrences of the at least one data segment in the file set, wherein each file in the file set has a Merkel tree structure which is represented by a fingerprint index comprising of hash fingerprints of the at least one data segment and the metadata for the at least one data segment;

determining, using the fingerprint index, a deduplication ratio of the file based on the at least one count;

migrating the file from the local storage device to a remote storage device according to a determination that the deduplication ratio of the file is lower than a threshold,
wherein the threshold is determined based on a total deduplication ratio of the file set,
wherein the total deduplication ratio reflects an average level of deduplication ratios of all files in the file set,
wherein migrating the file to the remote storage device comprises:
copying the at least one data segment of the file from the local storage device to the remote storage device;
copying the metadata of the file from the local storage device to the remote storage device, the metadata indicating that the file includes the at least one data segment; and
deleting the at least one data segment from the local storage device without deleting the metadata, determining, after migrating the file from the local storage device to the remote storage device, that an incremental backup file for the file is to be stored;

storing, in the remote storage device, different data segments of the incremental backup file relative to the file; and storing the metadata of the incremental backup file in the local storage device, the metadata indicating data segments included in the incremental backup file.

2. The method of claim 1, wherein determining at least one count comprises:
determining a set of data segments included in the file set;
determining a count set corresponding to the set of data segments, each count in the count set indicating a number of occurrences of one data segment in the set of data segments in the file set; and
determining, from the count set, the at least one count corresponding to the at least one data segment of the file.

3. The method of claim 2, further comprising:
performing a garbage collection process of the local storage device based on the determined set of data segments and the determined count set.

4. The method of claim 1,
wherein the at least one data segment comprises a plurality of data segments, and
wherein determining the deduplication ratio comprises:
determining multiple numbers of occurrences of multiple different data segments of the plurality of data segments in the file;
based on the multiple numbers of occurrences and multiple counts corresponding to the plurality of data segments, determining multiple duplication ratios corresponding to the multiple different data segments; and
determining the deduplication ratio based on the number of the plurality of data segments and the multiple duplication ratios.

5. The method of claim 1,
wherein the total deduplication ratio of the file set is determined based on a logical size and a physical size of the file set.

6. The method of claim 1, wherein the method is performed during a garbage collection process of the local storage device.

7. The method of claim 1, wherein the remote storage device comprises a cloud storage device.

8. An electronic device, comprising:
at least one processor; and
at least one memory storing computer program instructions, the at least one memory and the computer program instructions being configured, together with the at least one processor, to cause the electronic device to perform a process, the process comprising:
determining at least one count corresponding to at least one data segment of a file in a file set, the file set being stored in a local storage device, the at least one count indicating a number of occurrences of the at least one data segment in the file set, wherein each file in the file set has a Merkel tree structure which is represented by a fingerprint index comprising of hash fingerprints of the at least one data segment and the metadata for the at least one data segment;
determining, using the fingerprint index, a deduplication ratio of the file based on the at least one count;
migrating the file from the local storage device to a remote storage device according to a determination that the deduplication ratio of the file is lower than a threshold,
wherein the threshold is determined based on a total deduplication ratio of the file set,
wherein the total deduplication ratio reflects an average level of deduplication ratios of all files in the file set,
wherein migrating the file to the remote storage device comprises:
copying the at least one data segment of the file from the local storage device to the remote storage device;
copying the metadata of the file from the local storage device to the remote storage device, the metadata indicating that the file includes the at least one data segment; and
deleting the at least one data segment from the local storage device without deleting the metadata,
determining, after migrating the file from the local storage device to the remote storage device, that an incremental backup file for the file is to be stored;
storing, in the remote storage device, different data segments of the incremental backup file relative to the file; and
storing the metadata of the incremental backup file in the local storage device, the metadata indicating data segments included in the incremental backup file.

9. The electronic device of claim 8, wherein the electronic device is caused to determine the at least one count by:
determining a set of data segments included in the file set;
determining a count set corresponding to the set of data segments, each count in the count set indicating a number of occurrences of one data segment in the set of data segments in the file set; and
determining, from the count set, the at least one count corresponding to the at least one data segment of the file.

10. The electronic device of claim 9, wherein the at least one memory and the computer program instructions are further configured to, together with the at least one processor, cause the electronic device to:

performing a garbage collection process of the local storage device based on the determined set of data segments and the determined count set.

11. The electronic device of claim 8, wherein the at least one data segment includes a plurality of data segments, and wherein the electronic device is caused to determine the deduplication ratio by:

determining multiple numbers of occurrences of multiple different data segments of the plurality of data segments in the file;
based on the multiple numbers of occurrences and multiple counts corresponding to the plurality of data segments, determining multiple duplication ratios corresponding to the multiple different data segments; and
determining the deduplication ratio based on the number of the plurality of data segments and the multiple duplication ratios.

12. The electronic device of claim 8, wherein
the total deduplication ratio of the file set is determined based on a logical size and a physical size of the file set.

13. The electronic device of claim 8, wherein the electronic device is caused to perform the process during a garbage collection process of the local storage device.

14. The electronic device of claim 8, wherein the remote storage device comprises a cloud storage device.

15. A computer program product that is tangibly stored in a non-volatile computer-readable medium and comprises machine-executable instructions that, when executed, cause a machine to execute the steps of a method, the method comprising:

determining at least one count corresponding to at least one data segment of a file in a file set, the file set being stored in a local storage device, the at least one count indicating a number of occurrences of the at least one data segment in the file set wherein each file in the file set has a Merkel tree structure which is represented by a fingerprint index comprising of hash fingerprints of the at least one data segment and the metadata for the at least one data segment;

determining, using the fingerprint index, a deduplication ratio of the file based on the at least one count, the deduplication ratio indicating an overlapping level of the file with other files in the file set;
migrating the file from the local storage device to a remote storage device according to a determination that the deduplication ratio of the file is lower than a threshold, wherein the threshold is determined based on a total deduplication ratio of the file set,
wherein the total deduplication ratio reflects an average level of deduplication ratios of all files in the file set,
wherein migrating the file to the remote storage device comprises:
copying the at least one data segment of the file from the local storage device to the remote storage device;
copying the metadata of the file from the local storage device to the remote storage device, the metadata indicating that the file includes the at least one data segment; and
deleting the at least one data segment from the local storage device without deleting the metadata,
determining, after migrating the file from the local storage device to the remote storage device, that an incremental backup file for the file is to be stored;
storing, in the remote storage device, different data segments of the incremental backup file relative to the file; and
storing the metadata of the incremental backup file in the local storage device, the metadata indicating data segments included in the incremental backup file.

16. The computer program product of claim 15, wherein determining at least one count comprises:
determining a set of data segments included in the file set;
determining a count set corresponding to the set of data segments, each count in the count set indicating a number of occurrences of one data segment in the set of data segments in the file set; and
determining, from the count set, the at least one count corresponding to the at least one data segment of the file.

* * * * *